United States Patent
Hojaji et al.

(10) Patent No.: US 9,016,090 B2
(45) Date of Patent: Apr. 28, 2015

(54) GLASS MICROSPHERES COMPRISING SULFIDE, AND METHODS OF PRODUCING GLASS MICROSPHERES

(71) Applicants: Hamid Hojaji, Kensington, MD (US); Laura Gabriela Kocs, Feldafing (DE)

(72) Inventors: Hamid Hojaji, Kensington, MD (US); Laura Gabriela Kocs, Feldafing (DE)

(73) Assignees: Hamid Hojaji, Kensington, MD (US); Laura Gabriela Kocs, Feldafing (DE)

( * ) Notice: Subject to any disclaimer, the term of this patent is extended or adjusted under 35 U.S.C. 154(b) by 0 days.

(21) Appl. No.: 13/916,155

(22) Filed: Jun. 12, 2013

(65) Prior Publication Data

US 2014/0371116 A1   Dec. 18, 2014

(51) Int. Cl.
  C03B 1/02  (2006.01)
  C03C 8/02  (2006.01)
  C03C 12/00 (2006.01)
  C03C 11/00 (2006.01)

(52) U.S. Cl.
  CPC ................. C03C 11/002 (2013.01)

(58) Field of Classification Search
  USPC ............... 501/33, 21; 65/30.1, 33.9, 142
  See application file for complete search history.

(56) References Cited

U.S. PATENT DOCUMENTS

| | | | |
|---|---|---|---|
| 3,365,315 A * | 1/1968 | Beck et al. | 501/33 |
| 4,430,108 A | 2/1984 | Hojaji et al. | |
| 4,661,137 A * | 4/1987 | Garnier et al. | 65/21.4 |
| 4,778,502 A * | 10/1988 | Garnier et al. | 65/21.4 |
| 5,270,292 A | 12/1993 | Hojaji et al. | |
| 5,306,700 A | 4/1994 | Hojaji | |
| 5,405,590 A | 4/1995 | Macedo et al. | |
| 5,430,236 A | 7/1995 | De Macedo et al. | |
| 5,678,236 A | 10/1997 | Macedo et al. | |
| 6,334,337 B1 | 1/2002 | Macedo et al. | |
| 6,531,222 B1 * | 3/2003 | Tanaka et al. | 428/402 |
| 6,964,809 B2 | 11/2005 | Hojaji et al. | |
| 7,311,965 B2 | 12/2007 | Hojaji et al. | |
| 7,455,798 B2 | 11/2008 | Datta et al. | |
| 7,651,563 B2 | 1/2010 | Datta et al. | |
| 7,666,505 B2 | 2/2010 | Datta et al. | |
| 7,744,689 B2 | 6/2010 | Hojaji et al. | |
| 7,878,026 B2 | 2/2011 | Datta et al. | |

(Continued)

FOREIGN PATENT DOCUMENTS

AU  2006342007   10/2007
EP  0 359 362 A2  3/1990

(Continued)

OTHER PUBLICATIONS

International Search Report and Written Opinion dated Jun. 12, 2013, for PCT application No. PCT/IB 2014/058555, 7 pages.

(Continued)

Primary Examiner — Holly Le
(74) Attorney, Agent, or Firm — Evan Law Group LLC

(57) ABSTRACT

A method for manufacturing a plurality of glass microspheres comprises: melting a batch into a first glass melt in a melter system, processing the first glass melt into a second glass, pulverizing the second glass into a plurality of glass fragments, thermally processing the plurality of glass fragments into a plurality of glass microspheres, providing at least one of a plurality of redox reactions and a plurality of events in at least one of the first glass melt and a melt of the second glass, and the plurality of redox reactions and the plurality of events are induced by a plurality of redox active group (RAG) components.

20 Claims, 3 Drawing Sheets

(56) References Cited

U.S. PATENT DOCUMENTS

| | | | |
|---|---|---|---|
| 7,897,534 B2 | 3/2011 | Biscan et al. | |
| 7,976,939 B2 | 7/2011 | Hojaji et al. | |
| 8,197,932 B2 | 6/2012 | Buarque de Macedo et al. | |
| 8,236,415 B2 * | 8/2012 | Hojaji et al. | 428/318.8 |
| 8,414,699 B2 | 4/2013 | Hojaji et al. | |
| 8,574,358 B2 | 11/2013 | Biscan et al. | |
| 8,609,244 B2 | 12/2013 | Zhang et al. | |
| 2001/0043996 A1 * | 11/2001 | Yamada et al. | 428/34.4 |
| 2002/0004111 A1 * | 1/2002 | Matsubara et al. | 428/34.4 |
| 2006/0075704 A1 | 4/2006 | Hojaji et al. | |
| 2007/0131145 A1 | 6/2007 | Biscan et al. | |
| 2007/0275335 A1 | 11/2007 | Biscan et al. | |
| 2008/0096018 A1 * | 4/2008 | Zhang et al. | 428/402 |
| 2008/0202389 A1 | 8/2008 | Hojaji et al. | |
| 2008/0257218 A1 | 10/2008 | Hojaji et al. | |
| 2009/0008223 A1 | 1/2009 | Fujii | |
| 2009/0076196 A1 | 3/2009 | Hojaji | |
| 2009/0146108 A1 | 6/2009 | Datta et al. | |
| 2009/0156385 A1 | 6/2009 | Biscan et al. | |
| 2010/0040881 A1 * | 2/2010 | Beck | 428/402 |
| 2010/0192808 A1 | 8/2010 | Datta et al. | |

FOREIGN PATENT DOCUMENTS

| | | | |
|---|---|---|---|
| EP | 0 801 037 A1 | 10/1997 | |
| EP | 1 156 021 | 11/2001 | |
| EP | 1 160 212 | 12/2001 | |
| GB | 2 192 392 A | 1/1988 | |
| JP | H0977543 A | 3/1997 | |
| JP | H1095648 | 4/1998 | |
| JP | H10152356 A | 6/1998 | |
| JP | H11116299 A | 4/1999 | |
| JP | 2001130940 A | 5/2001 | |
| JP | 2002003248 A | 1/2002 | |
| RU | 2001027 C1 | 10/1993 | |
| RU | 2016702 C1 | 7/1994 | |
| RU | 2276638 C1 | 5/2006 | |
| RU | 2307432 C2 | 9/2007 | |
| RU | 2336293 C1 | 10/2008 | |
| RU | 98018 U1 | 9/2010 | |
| WO | 95/04010 | 2/1995 | |
| WO | 96/07538 | 3/1996 | |
| WO | 01/72863 A1 | 10/2001 | |
| WO | 2004/018090 | 3/2004 | |
| WO | 2004/101137 A1 | 11/2004 | |
| WO | 2005/092818 A1 | 10/2005 | |
| WO | 2007/070427 A3 | 6/2007 | |
| WO | 2008/131026 A1 | 10/2008 | |

OTHER PUBLICATIONS

Pavlushkin, N.M. "Chemical technology of glass and ceramics", Moscow, Stroiizdat, pp. 89-90, (1983).

Zivica, "High effective silica fume alkali activator," Bull. Mater. Sci., vol. 27, No. 2, pp. 179-182, (2004).

English translation of DE 100 26 022 A1 dated Dec. 2001.

* cited by examiner

GLASS MICROSPHERES COMPRISING SULFIDE, AND METHODS OF PRODUCING GLASS MICROSPHERES

FIELD OF INVENTION

The present invention is directed to glass microspheres and a method of manufacturing glass microspheres. More specifically, the present invention is directed to glass microspheres made from redox active glass, and the method of their manufacture.

BACKGROUND OF THE INVENTION

Various methods are already known in the art for the manufacture of glass microspheres.

In accordance with the methods available in the art, preformed glass particles may be converted into glass bubbles or micro-balloons. To create the glass bubbles the glass particles have to be post modified to contain the ingredients necessary for their expansion.

As known from the art, a silicate glass with over 14 wt % sodium oxide and 0.1 $Fe_2O_3$ is initially treated with high temperature steam and is used to form glass bubbles at about 1150-1200° C. In another known example, a silicate glass having a sodium oxide concentration of 13.5 wt % and a potassium oxide concentration of 3.2 wt %, with 0.2 wt % of sulfur in the form of $SO_4$ is melted and pulverized. The so formed cullet is dropped through a flame at about 1150-1200° C. to create a glass microsphere.

In accordance with other methods known in the art of glass microsphere production, a pre-melted glass frit is used to produce glass micro-bubbles with a chemical composition, expressed in weight percent, of at least 67% $SiO_2$, 8-15% RO, 3-8% $R_2O$, 2-6% $B_2O_3$, and 0.125-1.50% $SO_3$. The $RO:R_2O$ weight ratio is in the range of 1.0-3.5.

From further art references, similar techniques to manufacture glass spheres are also known. These techniques employ a powdered glass with a glass composition comprising ranges of $SiO_2$ of 50-57%, $R_2O$ of 2-15%, $B_2O_3$ of 0-20%, S of 0.05-1.5%, RO of 2-25%, $R_2O_3$ of 0-5%, and $R_2O_5$ of 0-5. From further yet art references, the use of an essentially borosilicate glass composition is known to manufacture glass spheres having an oxide range of $SiO_2$ of 60-90 wt %, an alkali metal oxide range of 2-20 wt %, a $B_2O_3$ range of 1-30 wt %, a sulfur range of 0.005 to 0.5 wt %, and other conventional glass-forming ingredients.

A particulate solid feed material having an average particle size of up to 25 microns is introduced at the top of a heating chamber into a "wall free" heated zone, according to a method known in the art for the manufacture of glass microspheres. The particles are transported to at least one flame front by a carrier gas comprising a fuel gas and air. The carrier gases maintain the particles in a dispersive state while the particles are heated to a temperature where at least partial fusion occurs, while the agglomeration of particles during fusion is inhibited. The resulting spherical particles are cooled and separated from the gas stream by a hot cyclone.

Yet another process for producing hollow microspheres know in the art comprises treating glass feed particles at a temperature above the working temperature of the glass. The particles are suspended in a gaseous current and passed through a burner for treatment. The particles are rapidly heated to about 1500 to 1700° C. for a residence time of less than about 0.1 seconds, and are cooled suddenly to below 750° C. The burner is operated such that the air factor, that is, the ratio of the amount of air introduced into the burner to the amount of air necessary to produce a stoichiometric combustion, is between about 0.75 and 1.1, or preferably 0.8-0.95. The particles are passed first through a reducing atmosphere and then through a non-reducing atmosphere.

Other known techniques for the manufacture of glass microspheres provide for a method in which feed material, in the form of solid glass particles, is introduced near the bottom of a furnace into an ascending column of hot gases. The feed material is entrained in an upward moving hot gaseous stream. The residence time of the particles within the furnace becomes a function of the mass of the particle, as the larger particles ascend through the hot zone of the furnace more slowly than the small particles due to the force of gravity acting on the particles. As a result, the residence time of the particles in the furnace is in direct relationship to the heat requirements necessary to expand the solid glass particles into hollow spheres.

Further technologies available in the art for manufacturing hollow microspheres employ a downward furnace suitable for heating discrete clay particles into hollow spherical particles. The particles are fed with a vibrating feeder into a hopper of a burner from where they are entrained in a stream of gas and passed through a flame front inside the furnace. The particles, in expanded state, are carried along with the flow of combustion gases and by gravity into a container. The container is at a sufficient distance from the combustion zone to provide a cooler zone, and solidification of the particles occurs before the particles hit any hard surfaces or before encountering each other to avoid agglomeration. A ratio of air to natural gas of about 2:1.1 was found to be suitable for raising the temperature of the particles to a range of 1350° C. to 1500° C., and to create the hollow microspheres.

A low cost method of converting solid glass or ceramic micro-particles into hollow microspheres, is also known in the art, and consists of feeding the solid glass or ceramic micro-particles, along with pulverized coal, into a coal-burning boiler. According to the known method coal-burning boilers generally produce micro-sized fused particles of ash, e.g. fly ash. A very small percentage of fly ash particles (about 1% and less) may be hollow, and these particles are commonly referred to as cenospheres. According to the known method the yield of hollow micro-particles is slightly increased by co-feeding fly or coal ash along with the pulverized coal.

Based at least on the above enumerated known methods and techniques, it is evident that there is still a need in the art for methods to manufacture hollow glass microspheres that have the following attributes:
high chemical durability in aqueous alkaline and acidic environments;
high crushing strength;
high hydrostatic pressure rating;
high specific strength;
are an eco-friendly product, able to utilize in their make-up industrial waste byproducts, converting waste materials into highly value added products; and
are produced by sustainable (energy efficient) methods via fast manufacturing.

SUMMARY OF THE INVENTION

The present invention has been conceived and developed aiming to provide solutions to the above stated objective technical needs, as it will be evidenced in the following description.

In accordance with an embodiment of the present invention is proposed a glass microsphere comprising a plurality of glass walls, and a plurality of hollow spaces, wherein said plurality of glass walls enclose at least one of said plurality of hollow spaces, wherein said plurality of glass walls comprise a second glass, wherein said second glass is formed by further processing a first glass melt, wherein said first glass melt is formed by melting a batch comprising a plurality of raw materials, and wherein the plurality of RAG components present in the first glass melt and a melt of the second glass is capable of providing at least one of a plurality of redox reactions and a plurality of events in the first glass melt and the melt of the second glass, thereby creating the glass microsphere.

In accordance with further aspects of the present invention, the at least one of the plurality of redox reactions is a non-equilibrium redox reaction. The redox active group (RAG) components are incorporated at least directly into the first glass melt, directly into said batch, and into said batch and the first glass melt. The plurality of redox active group (RAG) components comprises redox active group components in at least one of a gaseous form, a liquid form, a solid form, an aerosol form, and a combination thereof. The first glass melt comprises at least one of a plurality of sulfide ions and a plurality of sulfate ions, a concentration of the plurality of sulfide ions and a concentration of the plurality of sulfate ions comprised in the first glass melt is greater than zero. The first glass melt and the second glass comprise at least one alkali metal oxide, and when sodium oxide is at least one of the alkali metal oxides, a concentration of sodium oxide is less than 4 wt % based on a mass of either the first glass melt and the second glass.

In accordance with another embodiment of the present invention is proposed a method of manufacturing a plurality of glass microspheres, comprising melting a batch into a first glass melt in a melter system, processing the first glass melt into a second glass, pulverizing the second glass into a plurality of glass fragments, thermally processing the plurality of glass fragments into a plurality of glass microspheres, providing at least one of a plurality of redox reactions and a plurality of events in at least one of the first glass melt and a melt of said second glass, wherein at least one of the redox reactions and the plurality of events are induced by a plurality of redox active group (RAG) components.

In accordance with further yet another embodiments of the present invention. The plurality of redox active group (RAG) components comprises redox active group components in at least one of a gaseous form, a liquid form, a solid form, an aerosol form, and a combination thereof. The method further comprises incorporating the redox active group (RAG) components into at least one of the batch, and the first glass melt while the first glass melt is inside a melter system, and into said batch and the first glass melt, the incorporating step being performed by at least one of blending, bubbling, injection, spraying, dipping, and stirring. The batch comprises at least one recovered material. The melter system comprises at least one of a glass-melting zone, a glass melt processing zone, and a glass melt discharge zone. The method further comprises incorporating the plurality of redox active group (RAG) components inside either one of the first glass melting zone, the processing zone, the discharge zone of the melter system. A total residence time of the first glass melt in the melter system during the melting step is less than 12 hours. The batch comprises either one of a plurality of raw materials, the plurality of redox active group components and a combination thereof. Thermally processing said plurality of glass fragments comprises expanding said plurality of glass fragments by a plurality of gases generated via at least one of said plurality of redox reactions induced by said plurality of redox active group components. At least one of the plurality of redox reactions is a non-equilibrium redox reaction. The first glass melt comprises at least one of a plurality of sulfide ions and a plurality of sulfate ions, a concentration of the plurality of sulfide ions and a concentration of the plurality of sulfate ions comprised in the first glass melt is greater than zero. The first glass melt and the second glass comprising at least one alkali metal oxide, and when sodium oxide is at least one of the alkali metal oxides, a concentration of the sodium oxide is less than 4 wt % based on a mass of either the first glass melt and said second glass. The plurality of redox active group (RAG) components comprises at least one of a plurality of redox active group reactants, and a plurality of redox group reaction products.

In accordance with another embodiment of the present invention is proposed a composite product comprising a combination of the plurality of glass microspheres manufactured according to the various embodiments of the present invention, and at least one of a plurality of polymer matrices, a plurality of cementiteous matrices, a plurality of fluid matrices, a plurality of solid matrices, a plurality of fiber containing matrices, and a plurality of metal matrices.

The methods of the present invention are found to produce superior hollow glass microspheres of superior strength, able to withstand high hydrostatic pressures, versus the hollow glass bubbles manufactured by the process of simultaneous fusion of raw materials into glass at the time of expansion.

Since residence times are relatively short at the high temperatures required by the processing steps of melting and thermal processing of the present invention, the embodiments of the present invention also provide high energy efficiency in addition to the high throughput attributes. Considering the low cost of the recovered materials that are being utilized as the raw materials in the batch, the present invention provides viable economics together with environmentally friendly practices to manufacture high quality glass microspheres.

More detailed explanations regarding these and other aspects and advantages of the invention are provided herewith in connection with the exemplary embodiments of the present invention.

BRIEF DESCRIPTION OF DRAWINGS

The above and other aspects, features and advantages of the present invention will become more apparent from the subsequent description thereof, presented in conjunction with the following drawings, wherein.

DETAILED DESCRIPTION OF THE INVENTION

Figure 1:
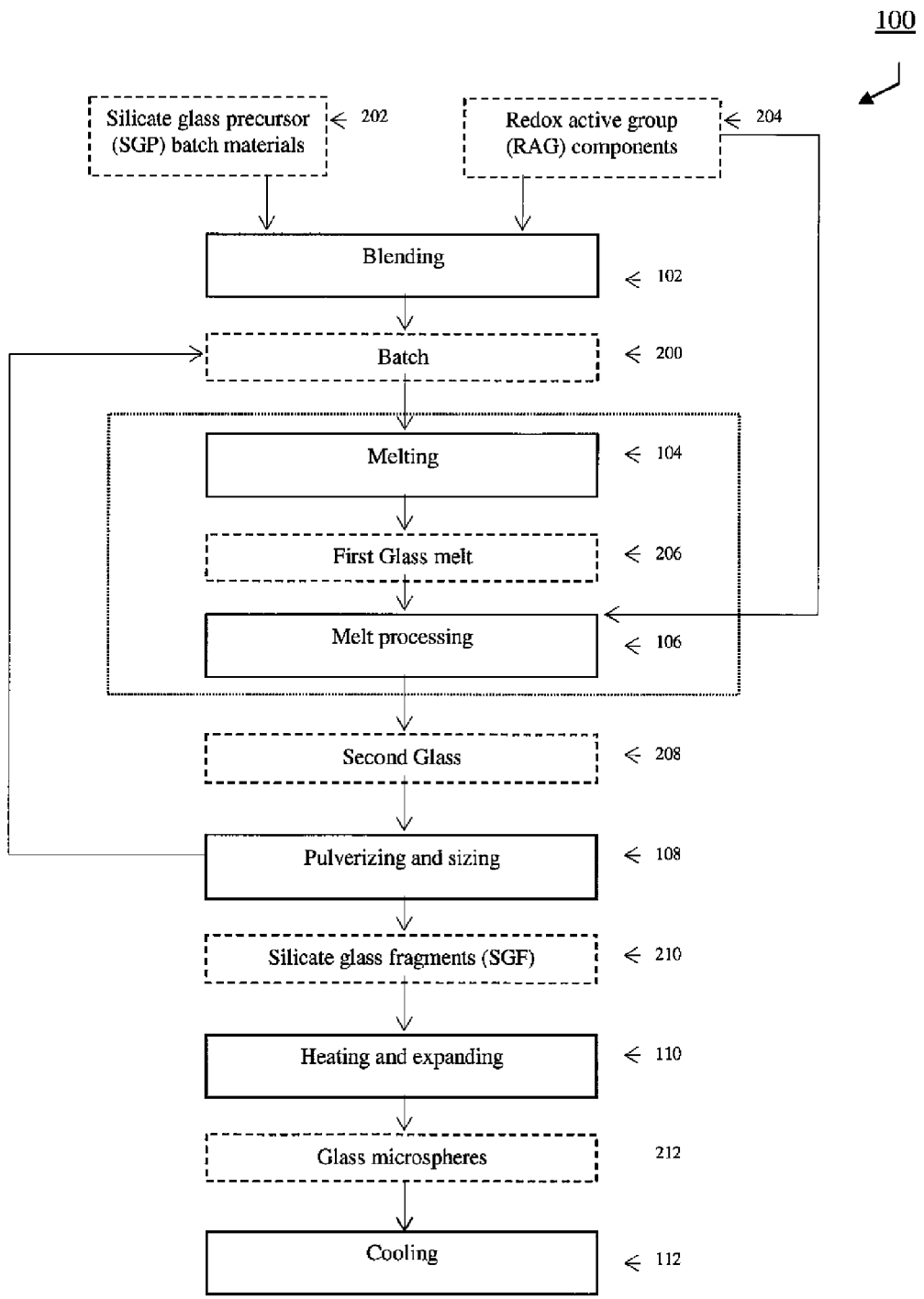
FIG. 1 is a block diagram of an embodiment of a method for manufacturing a plurality of glass microspheres in accordance with the present invention.

The following description of the presently contemplated best mode of practicing the invention is not to be taken in a limiting sense, but is made merely for the purpose of describing the general principles of the invention. The scope of the invention should be determined with reference to the claims.

Reference will now be made to the drawings wherein like numerals refer to like parts throughout. As described herein below, the embodiments of the present invention provide a plurality of chemically durable, synthetic glass microspheres having properties and characteristics similar or superior to the cenospheres derived from coal combustion, and synthetic microspheres manufactured in accordance with other methods known in the art. The preferred embodiments also provide a method for manufacturing the plurality of glass microspheres, including composition and processing, and uses for the microspheres in various applications, including as functional fillers in various composite materials, in applications related to oil and gas industry, such as proppants for hydraulic fracturing or hydrofracturing fluids, well casing cement, drilling fluids, and in constructions materials.

The glass microsphere manufactured according to an embodiment of the present invention comprises a single or a plurality of glass walls, and a single or a plurality of voids or hollow spaces defined and enclosed by said wall or walls. The terms of "glass microsphere", "synthetic glass microsphere", and "hollow glass microsphere" are interchangeably used throughout this document to refer to a structure that comprises a plurality of enclosure glass walls, surrounding at least one or a plurality of hollow spaces.

The synthetic glass microsphere as described herein generally comprises a substantially spherical outer wall and a substantially enclosed cavity or void defined by the wall, resembling the general configuration of harvested cenospheres from coal burning fly ash. All these structural aspects of the glass microsphere will be described in more detail in this document with reference to FIG. 2. In certain preferred embodiments, the synthetic glass microsphere has one or more of the following characteristics:

an aspect ratio of between about 0.8 and 1;
a void volume of between about 10 and 95%, based on the total volume of the microsphere;
an outer wall thickness of approximately 2 and 55% of the microsphere radius;
a composition comprising in weight percent: about 30 to 85% $SiO_2$, about 2 to 30% $Al_2O_3$, 2 to 30% divalent metal oxides selected from the group of MgO, CaO, SrO, BaO, about 4 to 12% monovalent metal oxides selected from the group of $Li_2O$, $Na_2O$, $K_2O$, $Cs_2O$, and 2 to 30% of other metal oxides and chemical species, including multivalent metal oxides which exist in multiple oxidation states such as $Fe_2O_3$, and chemical species such as borates, phosphates, sulfates, etc;
a silica to alumina ratio of greater than about 1 (mole ratio);
an average diameter of between about 5 and 1000 microns; and
a particle density (e.g. apparent density) of between about 0.1 and 2.2 $g/cm^3$.
Further structural and functional details will be provided in this document in connection with the glass microsphere while referring to the illustration made in the drawings.

As will be described in greater detail below, the synthetic glass microsphere of certain preferred embodiments of the present invention can be formed by performing a method of manufacturing a plurality of glass microspheres, comprising melting a batch into a first glass melt in a melter system, processing the first glass melt into a second glass, pulverizing the second glass into a plurality of glass fragments, thermally processing the plurality of silicate glass fragments to convert the plurality of glass fragments into a plurality of glass microspheres, providing a plurality of redox reactions and a plurality of events in at least one of the first glass melt and a melt of the second glass, the plurality of redox reactions and the plurality of events being induced by a plurality of redox active group components and their reaction products. It is of note that for simplicity of description in the rest of this document said redox active group components and their reaction products will be referred to simply as "RAG components".

According to one aspect of the present invention, non-equilibrium redox reactions are generated in the first glass melt, and the second glass melt by the RAG components.

The RAG components are components comprising at least one of reducing, neutral, and oxidizing species. The RAG components in combination with glass forming raw materials form a batch that is melted to provide a glass precursor from which a plurality of silicate glass fragments (SGF) are made. Throughout this document, the terms of redox active silicate glass fragments, silicate glass fragments, SGF and plurality of glass fragments are interchangeably used, whilst they all indicate the same glass fragments. According to an embodiment of the invention, the glass forming raw materials may be silicate glass forming raw materials that are melted to provide a first glass melt, a silicate glass precursor (SGP).

According to the present invention, the RAG components are one of intrinsic, extrinsic or a combination thereof, to the constituents that make up the raw materials batch. The composition of the RAG components is selected such to provide and/or influence a plurality of redox reactions and/or physical events to take place within the first glass melt of said raw materials. The RAG components and/or their reaction products formed and/or incorporated in the first glass melt are carried over to a second glass, and further provide and/or influence a plurality of redox reactions and/or physical events that take place within the second glass during the reheating, melting, and the expansion of the second glass, leading to the formation of hollow glass microspheres.

In accordance with an embodiment of the present invention the plurality of redox reactions and/or physical events may not be allowed to reach their final equilibrium state and may be intentionally terminated under a predetermined non or quasi-equilibrium state. Such a redox reaction is termed a "non-equilibrium redox reaction" throughout the present document.

In the present document the terms "non-equilibrium phenomena", "non-equilibrium chemical reactions" and "non-equilibrium redox reactions" are used interchangeably and are intended to be associated at least the meaning provided above, as a plurality of redox reactions that are not allowed to reach their final equilibrium states and may be intentionally terminated under a predetermined non or quasi-equilibrium state or may be terminated due to changes in the conditions to which the reactants are exposed to during the reaction. For example, by rapidly cooling the first glass melt below its softening temperature, as it happens by discharging the first glass melt from a melter, or by quenching the first glass melt in air, the plurality of redox reactions and/or physical events taking place in the glass are intentionally terminated (forced to terminate).

In addition, the non-equilibrium phenomena is understood in accordance with an embodiment of the present invention as including chemical and physical events such as chemical reactions, redox changes, and changes in the physical properties of the first and second glass melts, such as changes in solubilities of certain gases or vapors in the glass melts as a function of temperature.

In accordance with a particular embodiment of the present invention, non-equilibrium redox reactions are achieved by selecting the composition of the redox active group RAG components such that it is adapted specifically for a specific first glass composition. For any given first glass composition, an optimum composition of the RAG components is selected from a range, to encompass the processing temperatures and atmosphere that shall be selected in order to optimize the non-equilibrium redox reactions under a prescribed set of reactions and/or events, specifically with respect to time and/ or temperature. These aspects of the invention, especially insofar as the modes of realization of the non-equilibrium redox reactions and the reaction dynamics that are envisioned in accordance with the various embodiments of the present invention, are disclosed in detail in the reminder of this document.

From the perspective of redox reaction dynamics, redox reactions are separated at least operationally, into redox reactions, and non-equilibrium redox reactions.

By "redox reaction" is understood a reaction that is allowed to proceed from reactants to final reaction products without any external interruption, until the reactants are substantially depleted or become non-reacting. In contrast, the "non-equilibrium redox reactions" are reactions that are induced to proceed, but are intentionally ceased at a predetermined stage during the reaction. The predetermined stage is determined by the reaction time and/or reaction temperature and/or reaction dynamics, and as a result, both reactants and reaction products co-exist in the resulting glass melt. By triggering a ceased/dormant non-equilibrium redox reaction, the reaction may take a different path and/or rate to proceed, thus leading to a set of different products than otherwise would not have been possible if the reaction would have continued on its initial reaction path and/or with its originally intended rate. In order to redirect a non-equilibrium reaction to take a different path or assume different dynamics to completion, certain reaction parameters may be altered/changed from the initial/original reaction parameters. The parameters comprise one or a combination of ambient conditions, pre-treatments, incorporation of redox active group components, reaction temperature, heating rate, the redox state of the glass melt, the physical size of glass fragments, etc.

In accordance with an embodiment of the present invention, the constituents of the redox active group RAG components comprise a plurality of redox capable materials that either themselves and/or their reaction products can change the oxidation states in the first glass melt, and in the second glass melt based on a predetermined set of parameters. The changes in the oxidation states and/or the solubilities of the RAG components (including reaction products) result in the formation and evolution of gas in the second glass, leading to the formation of the hollow glass microspheres. In addition, a reduction of the melting temperature and/or viscosity of the second glass as compared to the first glass is realized as well.

Exemplarily, the plurality of redox active group components in accordance with the present invention include the chemical species of carbon containing, sulfur containing, selenium containing, oxygen containing, hydrogen containing, nitrogen containing, phosphorous containing, and multivalent metals containing materials. In accordance with a preferred embodiment of the present invention, the RAG components are redox capable materials comprising such materials as bonded and/or non-bonded carbon, hydrogen, nitrogen, and chemical species such as sulfates, sulfides, nitrides, nitrates, selenites, selenides, and compounds from the group of multivalent metals, and transition metals such as: tin, antimony, iron, copper, zinc, manganese, niobium, and vanadium. Advantageously, the majority of these materials have relatively low cost, and some of them already exist as impurities in many industrial wastes and byproducts. The plurality of RAG components comprises at least one electron donor and at least one electron acceptor.

In accordance with one embodiment of the invention, either pre- and post industrial, and consumer byproducts (also referred to generally as "recovered materials" throughout this document) are utilized as raw materials as part of the batch, in combination with the RAG components to be melted in a first glass. In accordance with an embodiment of the invention, the entirety or the majority of the quantity of the plurality of the RAG components may exist intrinsically in the recovered materials from which a batch is prepared and which is subsequently melted to form the first glass. As a result, only a portion of, and no additional RAG components are needed to supply the total amount of RAG components required to provide at least one of the plurality of the non-equilibrium redox reactions and the plurality of events to take place in the resulting first glass melt, and the second glass melt that lead to the creation of the glass microsphere.

However, in the absence of all or of a part of the necessary quantity of RAG components in the starting raw materials in the batch, further RAG components are added either to the batch prior to melting the batch into a first glass melt, or during the melting of the first glass, or upon processing the first glass melt while in a melter system, or upon discharging the first glass melt from the melter system. Said plurality of redox active group components are added into the first glass melt either inside or outside the melting zone of the melting system. As it will become apparent later in this document, the function of the RAG components is at least to produce gas in melt of the second glass of glass fragments and to lower the melting temperature of the second glass as compared to the first glass.

The non-equilibrium redox reactions of the present invention are time and temperature dependent, in addition to exhibiting potential dependencies on other parameters, such as the characteristics of their surrounding environment and atmosphere.

As described above, preferred embodiments of the present invention also provide methods of manufacturing a plurality of glass microspheres. Referring now to FIG. 1, FIG. 1 is a block diagram of an embodiment of a method of manufacturing a plurality of microspheres, in accordance with the present invention. The method is denoted with 100 in FIG. 1.

It is to be understood that a plurality of other variations from the embodiments of the present invention presented herein will be apparent to a person skilled in the art. Said plurality of other variations is as well considered to be comprised in within the scope of the present invention.

In accordance with an embodiment of the present invention, the method 100 of manufacturing a plurality of glass microspheres comprises the steps described in the following.

In accordance with a first step of method 100, in accordance with one embodiment of the present invention, a plurality of silicate glass precursor (SGP) raw materials 202 are combined with a plurality of redox active group (RAG) components 204. Exemplarily, the materials 202 and the components 204 may be combined by blending in step 102, to form a combination or a batch 200. In the following the terms "combination of the plurality of silicate glass precursor (SGP) raw materials and plurality of redox active group (RAG) components" and the terms "batch" or "combination" with be used interchangeably and employed as having the same meaning.

Exemplarily the plurality of silicate glass precursor (SGP) raw materials 202 comprise at least one or a combination of glass raw materials. Such glass raw materials are known to a person skilled in the art of glass making. Alternatively, materials 202 are made entirely or in part from a plurality of materials selected from a group comprising a silicate containing material, an aluminosilicate containing material, a borosilicate containing material, a lime silicate containing material, an incineration ash, a slag, coal ash, bottom ash, an asbestos containing waste material, an incineration ash/residue, a municipal waste material, a hazardous waste material, a radioactive waste material, and a medical waste material. All of the above enumerated materials 202 may be recovered materials. It is to be understood that the above mentioned materials 202 are only exemplary and their enumeration is not exhaustive. Any other materials apparent for the person skilled in the art are considered to be included within the scope of the present invention.

In accordance with another exemplary embodiment of the present invention, the plurality of silicate precursor (SGP) raw materials 202 may also include glass forming oxides, intermediate glass forming oxides, and glass modifier oxides. Exemplarily, the glass forming oxides are silica, phosphorous oxide, and boron oxide. Exemplarily, intermediate glass forming oxides are alumina, zirconia, titania, ferric iron. Exemplarily, the glass modifier oxides are oxides of calcium, magnesium, zinc, ferrous iron, and alkali metals. Again, any other glass forming oxides, intermediate glass forming oxides and glass modifier oxides apparent to a person skilled in the art are considered to be within the scope of the present invention.

In accordance with a further exemplary embodiment of the present invention the plurality of silicate glass precursor (SGP) raw materials 202 comprises non-waste raw materials, such as silica, siliceous material, alumina, alumina silicate materials, boron oxide, borosilicates, calcium silicates, aluminates, alumina bearing materials, lime and magnesium bearing materials such as limestone and dolomite, and alkaline oxide bearing compounds and minerals such as phosphates, carbonates and hydroxides of alkali metals. The above enumeration is not exhaustive and any other materials apparent for the person skilled in the art are considered to be included within the scope of the present invention.

According to yet another embodiment of the present invention, the plurality of silicate glass precursor (SGP) raw materials 202 may consist entirely or partially of waste materials or byproducts. These materials are used in combination with the plurality of redox active (RAG) components 204 to prepare the batch 200, and subsequently the first glass melt 206. In a particular embodiment of the present invention, a recycled waste material or byproduct may already be in a vitrified form. In addition, the vitrified waste material may intrinsically comprise the required concentration and types of the RAG components 204. In such case, the vitrified waste material is treated as the first glass 206. On the other hand, if there was not a sufficient concentration and types of the RAG components intrinsically present in a vitrified waste material, then the necessary amount of RAG components 204 is combined with that particular vitrified waste material in the batch 200 before proceeding to prepare the first glass melt 206. The reference to "sufficient" amounts in this document will be expanded upon in more detail while discussing specific examples. It is intended that the amounts and the types of the RAG components be present in amounts that lead to: producing enough gas for making hollow-microspheres, and to lowering the melting temperature of the second glass. The second glass and the hollow microspheres will be described later in this document at least in connection with the illustration of FIGS. 1 and 2.

Exemplarily, the recycled waste materials and byproducts are at least one of fly ash, bottom ash, incineration ash, waste glasses, blast furnace slag, alumina silicate containing materials, vitrified asbestos waste material, vitrified hazardous waste materials, vitrified radioactive waste materials, spent inorganic catalysts, red mud, kiln dust, spent oil shale, and residual biomass.

The recovered waste byproducts 202 may be selected from at least one or more of a silicate material, an aluminosilicate material, a borosilicate material, coal ash, bottom ash, slag, waste glass, an alumina containing material, a titania containing material, a zirconia containing material, a vitrified asbestos containing material, a vitrified hazardous waste material, a vitrified gamma emitting nuclear waste material, a biomass containing material, etc.

The compositional range of the silicate glass precursor SGP raw materials 202 is dependent on the target glass composition for the first glass 206, and consequently the second glass 208. In addition, the amount of each candidate raw material entering into the SGP raw materials mix depends on the constituents of the RAG components. For example, gypsum ($CaSO_4.2H_2O$) supplies sulfate ions as a part of the RAG components, and calcium ion that becomes a part of the first glass. In one way, the chemical composition of the batch 200 is more representative of the first glass 206, excluding the volatiles (e.g. water vapor), and the RAG components 204.

The SGP raw materials 202, in accordance with another embodiment of the present invention, are substantially free of any redox active components 204. In accordance with yet another embodiment of the present invention, the SGP raw materials 202 include all or a portion of the redox active components 204 intrinsically in their make up.

In accordance with the present invention, several distinct embodiments are envisioned: A first embodiment when the SGP raw materials 202 already intrinsically comprise a sufficient amount of RAG components 204. In this case, no further RAG components are added to the batch 200. A second embodiment wherein the SGP raw materials 202 already comprise intrinsically RAG components 204, but not in sufficient amounts. In this case the balance of the RAG components 204 are added to batch 200. In a third embodiment the SGP raw materials 202 are practically devoid of the RAG components 204. In this case, like the previous case, the RAG components 204 are added to the batch 200. In all the three embodiments listed above, additional RAG components may be added to the first glass melt 206 to adjust parameters such as rate, termination, reaction products, etc of the redox reactions. Other modalities of providing RAG components 204 to the raw materials 202 may be apparent to the skilled person aiming to practice the present invention. All said modalities are comprised within the scope of the present invention. Further in this document will be shown an embodiment of the invention wherein the addition of the RAG components 204 to the first glass melt 206 takes place either exclusively or in combination with addition of the RAG components to the SGP raw materials 202 via batch 200 and melting of the batch 200 to the first glass melt 206.

The RAG components 204 according to one embodiment of the invention are in the form of oxides, hydroxides, anions, metals, cations, chemical species, chemical compounds, elements, or a combination thereof.

In accordance with one exemplary embodiment of the present invention, the RAG components 204 may comprise one or a combination of compounds or species containing sulfur, carbon, oxygen, nitrogen, hydrogen, phosphorous, a multivalent metal such as a multivalent transition metal. The sulfur containing material(s) is selected from at least one of sulfates, sulfites, sulfides, and elemental sulfur. Alternatively, in accordance with another embodiment of the present invention, the RAG components 204 comprises at least one or more of sulfur containing material(s), carbonaceous material(s), and iron containing material(s), in addition to other appropriate redoxable materials, chemical species, and chemical compounds.

In accordance with another embodiment of the invention, at least a portion of the requested RAG components 204 are an integral part of the recovered waste byproduct(s). Alternatively, the RAG components 204 are comprised in additives added to batch 200 in addition to the raw materials 202 and the RAG components 204, or the RAG components 204 may be separately added to the batch 200 prior to vitrification of the batch into a first glass 206. The RAG components 204 may also be added during the melting of the first glass, and/or after the melting of the first glass 206, in the various zones of the melter system.

The step 102 of method 100, the combination step or the blending step of raw materials 202 with RAG components 204 is carried out in a blender such as a V-blender, a mill, a homogenizer, and in any other conventional and non-conventional mixers and blenders.

The RAG components 204 are in one of a solid, a liquid, a gaseous form, an aerosol form or a combination thereof. In accordance to one embodiment of the invention, the gaseous RAG components 204 comprise at least one of air, oxygen, nitrogen, hydrogen, steam, hydrocarbons, gaseous organics, $CO_2$, CO, $H_2O$ (liquid and/or vapor and/or steam), $SO_2$, $SO_3$, $H_2S$, $NH_3$, and a combination thereof. In another embodiment of the invention, the RAG components 204 are solids in the form of fine powders and solid aerosol. For example, carbon in form of coke, coal, or fine graphite powder in a gas carrier stream or liquid carrier stream is injected into the first glass melt 206 formed by melting the batch 200 to trigger a rapid redox reaction, such as reduction of sulfates, and multivalent metal oxides.

In accordance with the embodiment of the invention wherein the presentation of the RAG components 204 is in liquid form, the injectable liquid RAG components 204 are for example one of liquid water, peroxide, a soluble sulfate or sulfuric acid, liquid fuels, liquid oils, and liquid hydrocarbons. Said liquid RAG components 204 may be injected into the plurality of silicate glass precursor (SGP) raw materials 202, the batch 200, and the first glass melt 206 at various locations in the melter, such as a secondary melt chamber, a glass-refining chamber and the discharge chamber of the melter system. Solid form RAG components 204 may include iron bearing minerals and oxides, and sulfur bearing compounds and minerals such as gypsum, salt cake, sulfides, and carbonaceous materials, such as carbon, or a carbon containing material(s).

The RAG components 204 are elected such to trigger non-equilibrium redox reactions, such as oxidizing and reducing reactions.

In accordance with a preferred embodiment of the invention, the RAG components 204 included in the batch 200 are solids and comprise sulfates, transition metal oxides and compounds, and carbonaceous materials. Sulfates also include sulfites. In accordance with another preferred embodiment of the invention, the gaseous and/or aerosol form of RAG components 204 may be optionally purged/bubbled inside the first glass melt 206. Alternatively, the RAG components 204 are included in the first glass melt 206 by at least one injection, spraying, dipping, and stirring, or a combination thereof.

The gaseous RAG components 204 are added to the first glass melt alone or in combination with one or more of solids, liquids, and other gases include $SO_3$, $SO_2$, $H_2S$, $H_2$, N, $CO_2$/CO, $H_2O$, $O_2$, hydrocarbons, $NH_3$, $NO_x$, air, and various organic gases. All the gaseous RAG components 204 may be purged or bubbled inside the first glass melt 206.

According to the present invention, the concentrations of several RAG components 204 in the batch 200 based on the weight percentage of the component over the dry mass of the batch 200 are as follows: sulfates/sulfites calculated as $SO_4^{-2}$ is from 0.1 to 5%, sulfides and sulfur calculated as $S^{-2}$ from 0 to 2%, carbonaceous materials calculated as elemental carbon, from 0 to 3%, multivalent and/or transition metals calculated as metal oxides, from 0.1 to 25, and nitrates/nitrites/nitrides calculated as N from 0 to 2 wt %.

In accordance with one embodiment of the present invention, the compositional range of the first glass 206 in weight percentage falls within: 30-85% $SiO_2$, 4-12% of $R_2O$ (R is one or combination of $Li_2O$, $Na_2O$, $K_2O$), 2-30 $Al_2O_3$, 2-30% RO (R is one or combination of MgO, CaO, SrO, BaO), and 0-30% of other oxides and chemical species such as $B_2O_3$, $TiO_2$, etc.

The type and the amount of RAG components 204 elected to be combined, exemplarily via blending in a given batch 200, is based on the chemical composition of the SGP raw materials 202, and the redox reactions desired to be induced, which collectively will determine the specific physical and chemical properties of the glass microspheres created by practicing the method of the present invention. As previously mentioned, the RAG components 204 may be intrinsic to the SGP raw materials 202, or may be blended as partial or as completely separate entities with the SGP raw materials 202, prior or during the step 104 of method 100 of melting the batch 200 into the first glass melt 206.

According to the present invention, the RAG components 204 are capable to provide non-equilibrium redox reactions in the first glass melt 206, as it will be described in more detail further in this document.

According to the present invention, the plurality of RAG components 204 are capable to go through redox reactions and/or events in the first and second glass melts 206 and 208. By redox reactions are understood reduction-oxidation reactions. The redox reactions generally comprise chemical reactions, and the events comprise reversible and irreversible chemical reactions, and physical changes/events such as thermal reboil, and sublimation. During the occurrence of the redox reactions in the first and second glass melts 206 and 208, the RAG components 204 change their corresponding oxidation states of their ions/chemical species.

The redox reactions envisioned to occur in accordance with the present invention are at least one of an oxidation reaction, a reduction reaction, and a combination thereof. As such, a series of electron transfers take place between the constituents of the RAG components 204, that are elements, molecules, ions, and chemical species. The oxidation is associated with the loss of electrons resulting in an increase in oxidation state, and the reduction is associated with the gain of electrons resulting in a decrease in oxidation state by either one or a plurality of atoms, molecules, ions, and chemical species of the corresponding RAG component 204.

In addition to the SGP raw materials 202, and the RAG components 204, other additives may be added to constitute a combined batch 200. The additives may comprise a variety of recovered materials, and various chemical compounds, and chemical species that become a part of the batch 200 and therefore a part of the first glass 206. The additives are added to achieve the targeted composition of the first glass melt 206.

According to one embodiment of the present invention, the batch 200 may include various recovered waste byproduct(s), and a plurality of additives and/or glass additives. The plurality of additives and/or glass additives in addition to other chemical compounds, and chemical species may comprise one or more of the following compounds: silica, siliceous materials, aluminosilicate materials, alkaline earth metal containing materials, alkali metal containing materials, phosphate-containing materials, boron-containing materials, and a combination thereof.

In accordance with various embodiments of the invention the RAG components 204 are an integral part of either one or both the recovered waste byproduct(s), and the additives, or are externally added to the batch 200 prior to or during the vitrification of the batch 200 into the first glass melt 206, or are added directly to the first glass melt 206, or to a combination thereof.

Exemplarily, when a recovered waste byproduct, such as type C fly ash is used as the primary source for the SGP raw materials 202 a siliceous additive with high silica content is blended in batch 200 to increase the silica content of the first glass 206. Examples of such siliceous sources are ground silica sand, silica flour, diatomaceous earth, and ground quartz. In general, the majority of additives comprise one or more of glass formers, glass intermediate oxides, and glass modifiers. For examples, some common additives are materials that contain one or more of boron oxide, phosphorous oxide, titania, alumina, alkali metal oxides, and alkaline earth metal oxides.

As it will be disclosed in detail in the following portions of this document, with the means and methods of the present invention it is possible to manufacture glass microspheres 212 from SGP raw materials 202 having low alkali metal oxide content, of equal to less than 12 wt % of total alkali metal oxides on mass basis of the resulting first glass 206. In one preferred embodiment of the present invention, in order to provide a limit for the alkali content of the SGP raw materials 202, when sodium oxide is at least one of the alkali metal oxides, the concentration of sodium oxide in the first glass 206, and consequently as well in the second glass 208, should be below 8 wt %, and preferably less than 4 wt % based on a mass of either the first glass melt and the second glass. As a result the glass microspheres 212 manufactured from said SGP raw materials 202 will have exceptionally high chemical durability, as indicated by their very low leach rates in aqueous alkaline environments.

One way to determine the chemical durability of the glass microspheres 212 provided via the means and methods of the present invention, is by employing the test prescribed by standard ASTM C1285-02, referred to as the "product consistency test (PCT) test". An acceptable PCT test result in accordance with the present invention is a composite leach rate that is less than 500 g/m²·day (e.g. g/m² per day) at a pH of about 11, and a temperature of about 90° C. A preferred composite leach rate is less than 100 g/m²·day under the same test conditions mentioned above, averaged over test duration of 3 days.

An alternative criteria to determine the suitability of the glass microspheres 212 with respect to the chemical durability is based on a comparative leach test, that benchmarks the glass microspheres of the present invention against cenospheres that are harvested from fly ash, a coal combustion byproduct. Under a suitable comparative test protocol, the microspheres created by employing the means and methods of the present invention are tested under identical conditions side by side with the cenospheres. For example, in one aspect of the present invention, an acceptable comparative chemical durability test result for the microspheres 212, reported in terms of leach rate, is not more than 20% above the leach rate obtained under the identical conditions for the cenospheres.

In accordance with a second step of method 100, in accordance with one embodiment of the present invention, the batch 200 resulting from the combination step 102 is melted in a step 104 in a melter system. The result of said melting step 104 is the first glass melt 206.

The step 104, of melting of the batch 200 into the first glass melt 206 is carried out in a glass melter system under a variety of conditions elected depending on the redox state desired to be obtained in the first glass melt 206. The variety of conditions are controlled via controlling parameters, that for the melting of batch 200 are one of melting temperature, melting time, melting dynamics, such as stirring/agitation, and the melt redox state. The melt redox state is controlled intrinsically by non-equilibrium redox reactions, and extrinsically by melting either under one of reducing, neutral or oxidizing conditions. The extrinsic conditions apply to both the ambient and the melt pool environments where the glass melting is taking place.

Details regarding what constitutes a glass melter appropriately configured to fulfill the requirements mentioned above will be disclosed in the subsequent sections of this document. Further, known, and unknown details regarding melter configuration, envisioned by a person skilled in the art of melter design and not mentioned expressly but suggested and or hinted to in this document are as well considered to constitute a part of the present invention.

The redox reactions that the RAG components 204 are going through within the first glass melt 206 and the second glass 208 have the combined effects of lowering the melting temperature of the second glass melt 208 to a temperature that is lower than the melting temperature of the first glass melt 206, while at the same time producing a volume of gas that is employed to manufacture the plurality of hollow glass microspheres 212 from the second glass 208. It shall be understood that the RAG components 204 in accordance with the present invention include both the reactants and the reaction products of the RAG components. In one embodiment of the present invention, the "glass flow point temperature" of the second glass melt 208 is lowered as the result of the occurrence of the redox reactions provided by the RAG components 204. This lowering is measured as compared to the glass flow-point temperature of the first glass melt 206. By definition, the glass viscosity at the flow point temperature is about $10^5$ poise. In another embodiment, the melting temperature of the second glass melt 208 is lowered as the result of the occurrence of the redox reactions provided by the RAG components 204 as compared to the melting temperature of the first glass melt 206. In yet another embodiment, according to the present invention the "glass working-point temperature" of the second glass melt 208 is lowered as the result of occurrence of the redox reactions provided by the RAG components 204 as compared to the glass working-point temperature of the first glass melt 206. By definition, the glass viscosity at the glass working-point temperature is about $10^4$ poise.

In accordance with the present invention, the melting temperature of the second glass 208, is dependent on the concentration of ferrous iron in the second glass 208. For a given concentration of total iron in the forms of ferric and ferrous iron in the second glass 208, more ferrous iron corresponds to a lower melting temperature of the second glass 208. In a general scheme, more ferrous iron corresponds to a more reduced second glass 208. In contrast, more ferric iron corresponds to a more oxidized second glass 208. Depending on the redox state of the second glass 208 as being either oxidized, or reduced, there is a temperature difference of at least 10° C., preferably 40° C., and most preferably 80° C., between the melting temperatures of oxidized and reduced forms of the second glass 208.

Exemplarily, according to one embodiment of the present invention, the first glass 206 is melted under oxidizing conditions as dictated by the melting parameters and/or the melter requirements and/or limitations. For example, the electrodes in the melting zone of the melter system will last longer in contact with an oxidized glass as opposed to a situation when they are in contact with a reduced glass. The redox state of the first glass melt 206 can be changed in the melter system via direct incorporation of the RAG components 204 into the first glass melt 206, as will be disclosed further in more detail. In the melter system, reducing RAG components in gaseous or aerosols forms are brought in contact with the first glass melt 206 in a processing zone of the melter system, or in a discharge zone outside the melting chamber. The contact is made by injecting, purging, or bubbling the RAG components 204 in the form of gas and/or aerosol into the first glass melt 206.

As previously mentioned in this document the RAG components 204, according to the invention, are in the form of solids, liquids, gases, aerosols, and comprise oxides, hydroxides, anions, cations, chemical compounds, chemical species, elements, or a combination thereof. The RAG components 204 are capable of providing at least one non-equilibrium redox reaction in either one or both the first glass melt 206, and the second glass melt 208.

As it is described in detail in this document, according to one embodiment of the present invention, a plurality of glass microspheres 212 are manufactured from the batch 200 that comprises at least one of a plurality of silicate glass precursor raw materials 202 and at least a plurality of RAG components 204. The RAG components 204 included in the batch 200 undergo redox reactions while in the melter system while forming the first glass melt 206, and as such, the RAG components reaction products are created in the first glass melt 206.

A composition of the SGP raw material 202 according to one embodiment of the present invention, is preferably an alumina silicate based composition. A glass created from an alumina silicate based SGP raw material 202 exhibits high chemical durability in alkaline environments, and is suitable for forming thin partition walls or envelopes, surrounding the gas bubbles within glass microspheres 212. As such, the glass microspheres 212 are capable of withstanding high isostatic pressures of well over 1000 psi. Various additives, such as glass formers and glass modifiers may be added to the alumina silicate based SGP raw material 202 to impart specific properties. For example, in one possible embodiment, boron oxide is added as a glass former to extend the glass forming temperature range and to reduce the divitrification potential of the first and second glass melts 206 and 208. The composition of the second glass 208, for applications wherein the hollow glass microspheres 212 are to be exposed to high alkaline environment, needs to be highly chemically durable. For this reason in accordance with one embodiment of the present invention, the first glass 206, and consequently the second glass 208 comprise low concentrations of alkali metal oxides, and moderate to high concentrations of alumina, and alkaline earth metal oxides.

As it was previously mentioned, according to one aspect of the present invention, the SGP raw materials 202 comprise raw materials that are non-waste materials, and are considered ordinary glass raw materials. These SGP raw materials 202 are combined with the corresponding RAG components 204 to form the batch 200. As an alternative, the SGP raw materials 202 comprise and may be melted in step 104 from a combination of recovered materials, and non-waste raw materials. Exemplarily of the recovered materials are blast furnace slag, fly ash, bottom ash, red mud from aluminum smelting processes, kiln dust, spent oil shale, mine tailings, and spent catalysts.

The SGP raw materials 202 may be combined with the RAG components 204 in a melted or a non-melted state. In the embodiment of the invention where the SGP raw materials 202 are in a non-melted state, the RAG components 204 may all be added to the batch 200 prior to melting the SGP raw materials, or optionally they may be added during or after the melting of the SGP raw materials 202. As discussed above, the RAG components 204 may include one or a combination of solids, liquids, gases, vapors, aerosols that are introduced and incorporated into the first glass melt 206 during one or a combination of melting, processing the melt, conditioning the melt, refining the melt, and discharging processes, collectively referred to "while in the melter system". The introduction and/or incorporation of the RAG components 204 into the first glass 206 while in the melter system is carried out by blending, stirring, injecting, bubbling, mixing, spraying, dipping or a combination thereof. Other technique of incorporating the RAG components 204 into the first glass melt 206 while in the melter system used by a person skilled in the art are within the scope of the present invention.

Feeding and melting the batch 200 into a glass melter system are carried out in one or a combination of a batch method, a semi-continuous method, and a continuous method. The glass melters envisioned in accordance with the present invention are generally selected from one or a combination of a fuel fired glass melter, an electric glass melter, a plasma-torch glass melter, an inductively coupled glass melter, a radiant tube glass melter, and a submerged combustion melter.

Glass melter designs, including the melter geometry and the specifications of the energy input and control systems, must be adaptable to the composition of the first glass 206 and to aim at the successful execution of the redox reactions while in the melter system, leading to the formation of the second glass 208. Examples of fuel fired glass melter types envisioned to be used in accordance with the present invention are one or a combination of a regenerative end or cross fuel fired melter, a recuperative end or side-fuel fired melter, and a hybrid melter (combination of fuel firing and electric boosting). Fuel firing is preferably carried out by oxy fuel burner systems.

Within an electric type melter the molten glass acts as a conductor of electricity and in the process it heats up. Under ideal conditions, as much as 95% of the electricity is converted directly into heat by joule heating. The electrodes of the electric type resistance melter are placed either inside or outside the glass pool formed by the first glass melt 206. When the electrodes are placed inside the glass pool or glass tank, the electric type resistance melter operates in a direct heating mode. In an indirect mode of operation, the electrodes are placed outside the glass pool or the glass tank. In an all-electric melter, the melter primary chamber geometry is determined based on the position of the electrodes in the melter, electrode current density, production rate, load voltage, load power, and glass discharge types, such as a bottom discharge, or a side charge. Alternatively, as disclosed earlier heat may be provided to the glass melter via other heating methods, singularly or in combination.

In hybrid melters, the energy input is provided by the dual action of burning fuels and electrical boosting. The fuel burners are preferably oxy-fuel burners and electrical boosting is provided by appropriate AC power supplies.

Exemplary, the melting step 104 is carried out in a hybrid melter with a submerged combustion burner that is inserted directly in the glass pool. Alternatively, the submerged combustion burner is placed in an auxiliary compartment of the melter outside the primary melting area. A submerged combustion burner is capable of firing gaseous and liquid fuels, alone or in combination, such as firing with natural gas, hydrogen, and other combustible gases and fuel oils. Air, oxygen, oxygen-enriched air is used as the fuel oxidant. The submerged combustion burner operates to provide either an oxidizing or a reducing atmosphere. Submerged combustion burners achieve localized temperatures in excess of 1600° C.

Figure 3:
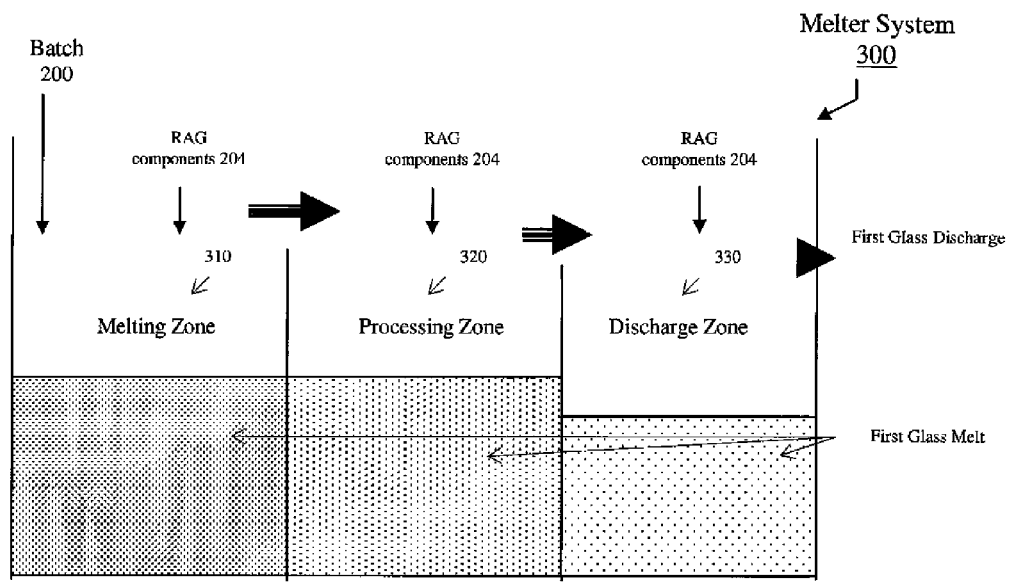
FIG. 3 is a schematic representation of a glass melter system 300 in accordance with the present invention.

Referring now briefly to the illustration of FIG. 3, in FIG. 3 is illustrated schematically a glass melter system 300 envisioned to be used in accordance with one embodiment of the present invention. Glass melter 300 according of the present invention comprises three zones, namely a melting zone 310, a processing zone 320, and a discharge zone 330. In the melting zone 310, apart from phenomena that are related to the melting of the materials introduced into the melter, the RAG components 204 may be as well introduced, as mentioned above, either directly into the glass melt, or as additional RAG components 204 mixed with the materials to be melted. The processing zone 320 is intended to allow at least the following processes to take place in the melter system 300: the introduction and incorporation of the RAG components 204 into the first glass melt 206, holding and storing the first glass melt 206, homogenizing the first glass melt 206, refining the first glass melt 206, and reheating the first glass melt 206. The discharge zone 330 comprises at least one or a combination of a trough, an outlet throat, an airlift system, glass re-heaters, plenum air heaters, and other related auxiliary components.

In an all-electric melter or a hybrid melter, additional electrodes are optionally installed between the melting zone 310 and the processing zone 320, and between the processing zone 320 and the discharge zone 330 to act as a barrier between the zones while maintaining the temperature of the glass melt flowing from the melt zone 310 into the processing zone 320, and into the discharge zone 330. This prevents an undesirable glass melt return-flow between the zones of the melter system 300.

In accordance with a possible embodiment of the present invention, the main source of energy of the melting zone 310 is an oxy-fuel heating system with the appropriate burners installed along the sides of the melting zone 310 structure. The energy input for melting is further increased by an electric boosting system in the melting area. A boosting system in the melting area supplies additional energy directly to the glass bath and leads to a higher melting capacity.

In accordance with one embodiment of the present invention, the processing zone 320 is compartmented, for example with the help of refining banks placed at equal or varying glass depths to allow incorporating RAG components 204 into, and/or refine the first glass melt 206. Movable gates/barriers are also installed between the compartments to provide the ability to divert or bypass the molten glass to move upwards, downwards, or sideways towards the glass discharge zone 330 while maintaining a high temperature.

In accordance with an embodiment of the present invention in an all-electric melter system 300, the electrodes are installed into the melting zone 310 from the top. The electrodes are inserted through the melter plenum structure and enter the glass pool through the melt open surface. This way they can be pulled out of the melter for inspection and possible replacement. In such an arrangement, the formation of an electrically conductive layer on the top of the melter, such as molten salts must be either avoided, or disrupted. This is because the electrodes' leads at the entry region into the melt pool will be contacted with the conductive layer and thus will experience a very high current density, almost equivalent to being short out. If left exposed for long enough time to the conductive layer, the electrode lead will be severely damaged.

Should the formation of a conductive salt layer be likely, the electrodes enter the melter through side wall blocks of the refractories or from the bottom. If metals collect at the bottom of the melter, care needs to be taken to keep out the precipitated metals away from the electrical path of the electrodes. In a situation when metal precipitation results in formation of a molten metal layer at the bottom of either the melting zone 310, or the processing zone 320, a sloped bottom is provided to collect and discharge the molten metal layer in a controlled manner out of the melter via a corresponding bottom discharge provided in each zone.

The electric melter system 300 uses various electrode materials, such as non-metallic electrodes such as graphite, ceramic electrodes such as molybdenum di-silicide, and metallic electrodes. Exemplary for the metal and metal alloy electrodes are electrodes made of molybdenum, molybdenum alloyed with zirconium oxide, molybdenum coated with molybdenum di-silicide, copper, nickel-chromium super alloys such as Inconel® alloy 690, and iron, among others. The metal electrodes may additionally be water or air cooled to prolong the service life of the electrodes. Air or water cooling of the electrodes in the electric type resistance melter alleviate the limitations in operating temperature and shift the operating temperature to higher temperatures than otherwise would be possible. In one embodiment of the present invention, indirect electric heating substitutes or complements the direct electrical heating, by using for example molybdenum disilicide electrodes.

The batch 200 is charged preferably over the entire area of the melt pool in the melting zone 310 through one or a combination of doghouses on a side wall, and from the melter top. The batch 200, from a feed hopper, is spread over the molten glass pool for example by a vibratory chute. The batch floats on the top of the glass pool, and is optionally pushed or swept by a pusher to form a cold cap. The cold cap greatly reduces radiation heat losses to the melter plenum space, and provides an efficient barrier against particulate emission to the melter off gas system.

In accordance with the present invention, the melter system 300 is preferably fed continuously fed, and continuously drained through one of an airlift system, and/or gravity, and/or a forehearth. The extent and depth of the cold cap is adjusted by controlling the rate of feeding the batch 200 to the melter, and the rate of discharging glass out of the melter. Exemplarily, a cold cap layer provides above 80% surface coverage over the melt pool having an average layer thickness, ranging from several centimeters to tens of centimeters. As a result, the overall thermal efficiency of the melter is improved as indicated by an average power consumption of equal or preferably less than one Kwh per kg of the first glass 206 produced. The power consumption number varies depending on the yield of the batch 200 to the first glass 206. As an exemplary case, a yield almost equal to one indicates that low volume of volatiles are lost from melting the batch 200 to the first glass melt 206.

It is advantageous to provide a bottom drain situated at the bottom of the melter, in either one of zones 310, 320, and 330 to drain the glass or the potentialy molten metals from the bottom of the melter. The drain nozzle is heated by electric heating means. The electric heating heats the glass or metal in the drain-hole and maintains the temperature necessary for the required draining rate. Glass is drained from the bottom by the action of the gravity. The drain can be started or stopped at any time by switching the electrical heating means on or off.

Air or other gases are blown into the melter through special bubbler nozzles installed in either one of the melter bottom, side, and/or entering the glass melt from the top. This produces bubbles in the glass and as the bubbles rise to the surface of the glass melt, keeps the glass melt pool in the melter agitated. The bubbling gas is exhausted into the furnace off-gas system. The upward movement of the bubbles produces strong localized convection currents around their path, and these currents move the glass upwards and cause an increase in the glass melt temperature at the bottom of the glass pool, which otherwise would be cooler than the top. The bursting bubbles on the glass surface also create an effective barrier that prevents the unmelted batch from moving downward prematurely. In most cases, bubbler tubes are made from durable refractory materials such as molybdenum disilicide, are installed in strategically elected points in the melter for maximum effectiveness.

The melting time is defined as the residence time of a portion of the batch 200 from a time that the batch 200 is fed to the melter till the time that the first glass 206 is discharged in step 204. The residence time of the first glass in the melter system in step 204 is estimated as the capacity of the melter in kilograms, divided by the batch feed rate to the melter, in kilograms per hour. The residence time is measured in hours. The residence time of the batch 200 in the melter system 300 until the discharge of the first glass melt 206 under continuous and non-interrupted operation is less than 18 hours, and preferably under 12 hours, and most preferably is equal to or under 5 hours.

In accordance of the present invention, irrespective of the type of melter used, the melting temperature of the batch materials 200 is between 1200 to 1600° C. The actual value of the temperature in this range is strongly correlated with the chemical composition of the batch 200.

A plurality of non-equilibrium redox reactions take place while and/or after the batch 200 is melted into the first glass 206 in step 204.

When RAG components are an integral part of the batch 200, or when the RAG components are added in the melter 300 or when both cases are present, then the batch 200 has to reside in the melter a time that is long enough to melt into a first glass melt 206. However, the residence time in the melter should not exceed the time that is required to complete the redox reactions that will be initiated by the RAG components 204. Hence, in order to achieve the desired non-equilibrium redox reactions, the reactions need to be terminated for example by moving or discharging the first glass melt 206 from the melter. As such, the temperature of the glass melt is dropped and the glass solidifies, and the corresponding redox reactions are not able to proceed in the solid glass to reach their equilibrium points.

Since the melting residence time is kept relatively short, a faster dissolution of the batch materials 200 has to be ensured. To ensure efficient heat transfer and thus faster dissolution of the batch materials 200 into the glass pool in the melter, the melt is preferably agitated, in accordance with one embodiment of the present invention. Melt stirring or agitation is achieved by at least one of an electrical means, such as electric current convection, a thermal means, such as forced thermal convection, mechanical means, such as stirring, and bubbling means. Bubbling gases via lances (bubblers, nozzles) into the glass pool is an efficient way to provide agitation in the melt pool. According to the present invention, oxidizing, reducing, and neutral gases and/or vapors and/or aerosols are as well used for bubbling the glass pool. Oxidizing, reducing, and neutral gases and/or vapors and/or aerosols are elected to be introduced into the glass pool depending on the redox reactions to be initiated or enhanced or terminated in the glass melt. For example, to provide an oxidizing melt environment, oxygen or a mixture of air and oxygen is used. To provide for a reducing environment, for example forming gas (mixtures of hydrogen and nitrogen), hydrogen sulfide, a variety of gaseous hydrocarbons, and ammonia is used. To provide for a neutral environment, air, and/or nitrogen, or inert gases are used.

The flow rate of the bubbling gas or of the other media provided is adjusted as appropriate, adjustment that can vary from several liters per hour to tens of liters per minute. The numbers of lances/bubblers, their locations, together with the airflow patterns from the lances into the melt pool are adjustable in order to provide for the desired residence time and the desired redox state of the first glass melt 206 before being discharged from the melter. In accordance with one embodiment of the present invention, the bubblers are located at or near the bottom portion of the melting chamber beneath the glass pool, for providing the gas bubbles directly into the glass melt. Bubbling or purging gas and/or aerosols may be provided as well in other parts of the melter, outside the main melting chamber, as will be disclosed later.

Glass mixing efficiency should be balanced against the melt pool contact refractory erosion rate. Accordingly, to achieve non-equilibrium redox state in the first glass melt 206, it is within the scope of present invention to maximize the melting rate while keeping the eroding rate of the contact refractories reasonably low.

In one aspect of the invention, the gases and/or aerosols used for providing agitation in the glass melt, for example by bubbling, can also take part in providing the non-equilibrium redox reactions in the first glass melt 206, and thus as such are considered to be "part of the RAG components" 204. The gaseous and/or aerosols RAG components thus have the dual function of providing agitation in the glass melt/pool and at the same initiating and/or assisting, and/or terminating the non-equilibrium redox reactions of the first glass melt 206. In one embodiment of the present invention, the gaseous and/or aerosolic RAG components 204 are introduced in the processing and discharge zone 330 of the melter system 300. Exemplarily, they may also be introduced in the processing zone 320, that exemplarily comprises one or a combination of a holding and storing section, a homogenizing section, a refining section, a reheating section, sections that all pertain to the first glass processing zone 320. Exemplarily, the gaseous and/or aerosolic RAG components 204 are introduced in the discharge zone 330 that comprises one or combination of trough and/or outlet throat section, and the airlift section, sections that pertain to the first glass discharge zone 330.

The introduction of the RAG components 204 in the melter system 300 results in the initiation, continuation and enhancement, or the termination of the non-equilibrium redox reaction taking place in the melter system 300. In accordance with the present invention, concurrent redox reactions may take place in the melter system 300, and multiple RAG components 204 may be introduced simultaneously or in stages to provide for either one or a combination of initiation, enhancement/continuation, and termination of the corresponding redox reactions.

In accordance with one aspect of the present invention, the melting step 104 comprises the further introduction in the first glass melt of specific RAG components 204, that are introduced by at least one of bubbling, injection, or by any other introduction method into the first glass melt 206 in order to incorporate certain desirable chemical and/or redox properties into the first glass melt 206. Exemplarily, the further RAG components are introduced by bubbling oxygen into the first glass melt 206 in order to shift the glass redox to be more oxidizing. Exemplarily, hydrogen is also introduced as RAG component 204 to reduce the oxidation state of the first glass melt 206. Because of the direct incorporation of the further RAG components 204 into the first glass melt 206 fast redox changes are induced in the first glass melt 206. These redox changes, that take place fast in the first glass melt 206, also affect the oxidation state of the multivalent metal ions present in the first glass melt 206 as a part of the RAG components 204. Single and multivalent metals can be added as a part of the RAG components 204 directly to the first glass melt 206 for scavenging oxygen from the glass and in the process forming the corresponding metal oxides.

An advantage of introducing gaseous and/or aerosolic RAG components 204 in the discharge zone 330 of the melter system 300 is that the introduced RAG has the dual function of lifting the molten glass and at the same time providing for non-equilibrium redox reactions in the melter system 300. In an exemplary case, the introduced RAG components 204 terminate the redox reaction(s) taking place in the first glass melt 206 present in the discharge zone 330 of the melter system 300, or in another case, initiate a redox reaction that will be continued in the second glass 208 when said second glass 208 is melted in a firing furnace. Another advantage is that the non-equilibrium redox reactions are isolated to the glass present in the discharge zone 330, and thus only affect the glass being discharged and not the entire glass pool residing inside the processing and melting zones 310, and 320.

Therefore, advantageously the first glass melt 206 present in the main glass pool residing in the melting zone 310 is enabled to selectively have a redox state that is the least damaging or corrosive to the melter electrodes and contact refractories, but is different from the targeted redox. The redox of the first glass melt 206 is subsequently adjusted and tuned to the desired state downstream from the main glass pool, for example in the processing zone 320, and/or in the discharge zone 330, or in any other auxiliary chambers present in the melter 300 before the first glass melt 206 is finally discharged from the melter system 300.

As mentioned before, instead of or in combination with the glass melting by Joule heating, other forms of glass melting are also within the scope of the present invention including melting using a plasma torch, an inductively coupled source, a fossil fuel source, a submerged burner, and a combination thereof.

For example, in the case of employing iron as the multivalent metal in the RAG components 204, by creating a reducing condition in the melter system 300, a portion of the ferric ions is converted to ferrous ions. Also, in another example, incorporating hydrogen sulfide as a part of the gaseous RAG components in the first glass melt 206 has the dual effect of reducing the glass and forming a metal sulfide. As mentioned above, the presence of sulphur in the form of sulfate and sulfide in the second glass melts 208 leads to the formation of sulfur dioxide in the glass, with the desirable effect of creating the glass microspheres.

In accordance with another embodiment of the present invention, the RAG components 204 are introduced in the first glass melt 206 in the melter system 300 as liquids in the form of liquid aerosols.

The liquids, in the form of either one of liquid droplets (mist), stream, aerosol or a combination thereof, are injected into the first glass melt 206 while in the melter system 300. For example, a liquid-gas mixture is injected into the first glass melt 206 while in the melter system 300 or while the first glass melt 206 is discharged from the melter 300. The liquid may be water based, or liquid organic based. Exemplarily, water dissolves in the first glass melt 206 in relatively low quantities (e.g. about 0.1 to 0.2 wt %), but it is a very powerful fluxing agent in the glass, and lowers the viscosity and the melting temperature of the resulting glass. In addition, water is an effective blowing agent, useful in expanding the second glass melt 208 contained in the silicate glass fragments 210, into hollow glass microspheres 212.

In accordance with yet other aspects of the present invention, the RAG components 204 added to the first glass melt 206 are presented as solids and liquids in the form of a fine powders, spray or fine droplets, solid aerosol, liquid aerosol, or a combination thereof, and added as such to either the batch 200 and/or the first glass melt 206.

Solids, exemplarily in the form of either fine powders or solid aerosol, are injected into the first glass melt 206 at various locations in the melter system 300. For example, carbon in form of coke or fine graphite powder in a gas carrier stream or liquid carrier stream is injected into the first glass melt 206 to induce reduction of the chemical species of the first glass 206 via corresponding redox reactions. In the process, the carbon oxidizes to carbon dioxide and/or carbon monoxide, leaving the melter system 300 through the off-gas system. Metal powders such as magnesium, copper, iron, etc. also when added directly to the first glass melt 206 as a part of the RAG components tend to oxidize in the molten glass without producing any appreciable gaseous reaction products.

Liquids, exemplarily in the form of liquid aerosol, slurries, and spray, are also injected into the first glass melt 206 at various locations in the melter system 300. For example, solutions, slurries, organics liquids, hydrocarbons, fuels and alike are injected with or without a gas carrier into the first glass melt 206 to provide corresponding redox reactions.

The first glass melt 206 formed from a batch comprising the SGP raw materials 202 and the RAG components 204 has a melting temperature above 1000° C., and preferably between 1200° C. and 1500° C.

Exemplarily, gaseous RAG components 204 are air, oxygen, nitrogen, hydrogen, steam, hydrocarbons, gaseous organics, $CO_2$, CO, $H_2O$ (vapor), $SO_2$, $SO_3$, $H_2S$, $NH_3$, and a combination thereof. Exemplarily, the injectable liquid RAG components 204 are one or a combination of liquid water, peroxide, sulfuric acid, liquid fuels, organic liquids, slurries, and solutions of various chemical species. Exemplarily, the injectable solid RAG components 204 are solid carbonaceous materials such as anthracite powders, graphite powders, metallic materials such as iron dust, and various chemical species such as sulfur, nitrides, borides, carbides, etc.

As noted previously, if the SGP raw materials 202 already include redox active components intrinsically, then the redox active components comprised by the SGP raw materials 202 are counted as a part of the RAG component 204. Solid RAG components 204 that may be intrinsically present in the SGP raw materials 202 include iron bearing minerals and oxides, multivalent metal oxides, and sulfur bearing compounds and minerals such as gypsum, salt cake, carbonaceous materials, such as carbon, or a carbon containing material(s).

The first glass 206 preferably has a total alkaline metal oxides content of less than 12 wt %, more preferably, less than 10 wt %, and most preferably less than 6 wt %. The preferred concentration of sodium oxide in the first glass 206 is less than 10 wt %, and more preferably less than 8 wt %, and most preferably less than 4 wt %. All the wt % (weight percentage) numbers are calculated based on the mass of the first glass 206.

Discharging the first glass melt 206 from the melter may be carried out by using a gaseous RAG component 204, or a gaseous stream/carrier that includes a RAG component 204 to lift the glass melt and discharge it out of the melter. According to this embodiment of the invention, the gas stream has the dual function of lifting the glass out of the melter 300 and providing the RAG components 204 needed for triggering the non-equilibrium reactions.

By discharging the melted batch 200 or the first glass melt 206, and as the glass cools to room temperature, the redox reactions taking place in the glass melt are conveniently terminated or stopped from progressing. There are different ways to discharge the first glass melt 206 from the melter 300. Exemplarily, the first glass melt 206 is discharged by an airlift system, out of the melter system 300 from the side or from the top of the melter 300. Another option is to gravity discharge the glass from the bottom. It is also envisioned to discharge the glass by overflowing into a trough as the glass inventory inside the primary melt pool (e.g. melting zone 310) reaches a threshold. In another melter configuration, the melter may be tilted in order to discharge the glass.

Any or a combination of discharge methods may be employed to adapt and couple the discharge operation to the steps of processing the glass in step 106, such as simultaneous forming operation and cooling the first glass melt 206. Exemplarily the discharge methods are discharging the glass between air-cooled or water-cooled counter rotating a pair of metal rollers to simultaneously forming glass ribbons, and cooling the first glass melt 206.

In accordance with the present invention, the method 100 also comprises a step of processing 106 of the first glass melt 206, that was created at least by the step of melting the batch 200 at step 104. At step 106, the first glass melt 206 is processed into a second glass 208.

In accordance with various embodiments of the present invention, the processing step 106 comprises at least one or a combination of the following steps: shaping/forming the discharged first glass melt 206 and cooling the first glass melt 206.

According to the present invention, the glass that is discharged from the melter 300 and cooled to room temperature is identified as the second glass 208.

Within step 106, the first glass melt 206 is cooled forming solid glass of various forms and shapes. The solid forms comprise a plurality of flakes, fragments, ribbons, fibers, sheets, rods, pellets, gems, spheres, or a combination thereof. It should be noted that any other shapes of the second glass 208 are within the scope and spirit of the present invention. In one embodiment of the invention, a heat and steam recovery system is also employed to recover either the heat and/or the steam liberated by the first glass melt 206 during the cooling step 106. The recovered heat is utilized for various purposes, including preheating the batch 200, or for heating the primarily and the secondary air utilized in a firing furnace in step 110.

In one embodiment of the present invention, air cooled or water cooled steel rollers are used to cool and flatten the discharging molten first glass 206 into a thin ribbon that can be easily broken up into small fragments.

In accordance with another embodiment of the invention, the discharging molten first glass 206 is water quenched by directing and dropping the discharging molten first glass 206 directly into a water bath. Due to thermal shock, in contact with water, the suddenly cooled molten glass shatters into small fragments. This is an effective way of cooling and fragmenting the molten first glass 206, followed by a drying step before further size reducing the resulting fragments of second glass 208.

In accordance with one embodiment of the present invention, upon cooling in step 106, the solid second glass 208 is pulverized in step 108 to provide a plurality of glass fragments (SGF) 210 having a predetermined average particle size, and particle size distribution. In accordance with one embodiment of the present invention, step 108 includes one or more size reduction processes, such as a coarse pulverization step followed by a finer size reduction step, and a screening step.

According to the present invention one or a combination of hammer mills, jaw crushers, and rotary crushers are used for coarse grinding of the second glass 208. One of centrifugal mills, disc mills, ball mills, jet mills, impact mills, high-speed rotary mills, and similar equipment may also be used for finer size reduction of the fragments obtained from the coarse grinding of the second glass 208. Without being bound to a specific size reduction method, fluid bed jet milling is a preferred method of fine grinding and size reduction and classification of the glass particles suitable for use as the plurality of glass fragments SGF 210. The fluid bed jet mill incorporates dense phase micronization using opposing jets in combination with centrifugal air classification, all within a common housing. This combination allows for comminution/size reduction by particle on particle impact for breakage and a high degree of particle dispersion for improved separation resulting in a narrower particle size distribution, zero to very low contamination, and a lower overall energy consumption compared to other commercially available techniques. This size reduction method ideally provides a top particle size of about 150 microns, with a tunable narrow size distribution at a desired range (for example between 50-120 microns), and having a tail end of the particle size distribution at less than 5 wt % below 5 microns. Should larger top size SGF fragments be desired, e.g. above 150 microns, a disc mill equipped with an air classification unit is used.

The silicate glass fragments 210 are as well screened in step 108. The undersized fraction of the silicate glass fragments 210 is optionally recycled back to the batch 200 in step 102 to be blended in, or to be directly fed to the melter 300. On the other hand, the oversized portion of the silicate glass fragments 210 is optionally recycled back to the fine grinding step to be size reduced. The preferred average particle size of the silicate glass fragments 210 is determined by end use of the plurality of the glass microspheres 212 manufactured in accordance with the present invention. For example, if the glass spheres 212 are to be used in the oil and gas well drilling cement (i.e. drilling mud), oil and gas well casing, and oil and gas hydraulic fracturing applications, the average particle size of the silicate glass fragments 210 is in a range of 1-1000 microns, preferably in a range of 5-600 microns. A typical ratio of the particle size of the hollow glass microspheres 212 (spherical diameter) to the average particle size of the silicate glass fragments 210 (e.g. equivalent spherical diameter) is from 1.01 to 3.0 and preferably from 1.035 to 2.7. A ratio of greater than one means the glass microspheres 212 are expanded compared to the silicate glass fragments 210. Exemplary, at a ratio of 1.5, a silicate glass fragment 210 at an average particle size of about 100 microns forms a hollow glass microsphere 212 of an approximate average particle size of 150 microns. The particle density (apparent density) of such glass microsphere is estimated from the expression:

$$\rho_h = \rho_f (d_f/d_h)^3$$

where $\rho_h$, and $\rho_f$ are the apparent particle density of the glass sphere 212, and of the silicate glass fragment respectively, and $d_f$, and $d_h$ are the mean diameter of the silicate glass fragment 210, and of the glass sphere 212, respectively. The apparent and true densities of the glass fragment 210 are essentially equal, with the assumption that there are no substantial internal porosities in the glass fragment 210. Assuming an apparent particle density of 2.4 g/cc for the silicate glass fragments, the estimated particle density of the glass microsphere 212, having a particle size of about 150 microns is about 0.7-0.75 g/cc at a ratio of 1.5. Exemplarily, at a ratio of 2.4, the resulting hollow glass microsphere 212 would have a particle size of about 240 microns, and an approximate particle density of about 0.17-0.18 g/cc.

The above examples assume that the apparent particle density of the plurality of glass fragments 210 is about 2.4 g/cc (e.g. equal to the particle true density). It must be understood that the glass fragments 210 may include micro-bubbles throughout their volume, and as a result have a lower apparent particle density than 2.4 g/cc. Nevertheless, according to the present invention the glass fragments 210 are considered substantially solid.

The method 100 of manufacturing a plurality of glass microspheres further comprises the step 110 of thermally processing the plurality of silicate glass fragments 210 to convert said plurality of silicate glass fragments 210 into a plurality of glass microspheres 212. Said conversion occurs due to the provision of at least one of a plurality of redox reactions and plurality of events in at least one of the first glass melt 206, and a melt of the second glass 208, the plurality of redox reactions and the plurality of events being induced by a plurality of redox active group (RAG) components 204.

In step 110, the plurality of glass fragments 210 is heated in a furnace, preferably in a suspended state, to a temperature where the viscosity of the glass is less than $10^5$ poise, preferably less than $10^4$ poise, and most preferably less than $10^3$ poise, temperature at which the silicate glass fragments 210 assume a round shape while residing in the suspended state inside the furnace. A temperature at which the above enumerated conditions are fulfilled is denominated the "firing temperature" and the time necessary for the above enumerated conditions to occur is denominated "residence time". The redox reaction(s) induced or associated with the RAG components 204, this time present in the second glass melt 208, (including the reaction products of the RAG components formed previously by the non-equilibrium redox reactions in the first glass melt 206) generate at least one gaseous product expanding the softened plurality of glass fragments 210 into a plurality of hollow glass microspheres 212 while in the furnace.

The plurality of glass fragments 210 comprise the second glass 208.

The redox reactions occurring in the second glass melt 208 are affected by either one of the oxygen concentration and the fugacity in the furnace hot zone within the atmosphere surrounding the softened plurality of silicate glass fragments 210. The redox reactions that are triggered by the RAG components 204 within the softened glass fragments 210 are somewhat sensitive to the oxygen fugacity within the heated zone of the furnace.

According to the present invention, the process of gas generation within the heated glass fragments 210 coincides with the formation of fluxes that tend to lower the melting temperature of the second glass 208. The redox reactions associated with the RAG components 204 provide gaseous products that expand the molten plurality of silicate glass fragments 210 into the hollow glass microspheres 212. Also, the redox reactions associated with the RAG components 204 provide fluxing oxides that lower the melting temperature of the second glass 208 as compared to the melting temperature of the first glass 206. In order to facilitate the occurrence of the redox reactions in the second glass melt 208 in accordance with one embodiment of the present invention, an appropriate atmosphere for the operation of the firing furnace is established, while the glass fragments 210 are being heated, melted, and expanded into the glass microspheres 212. It has been found that firing a gas burner near its stoichiometric oxygen-to-gas ratio provides said appropriate atmosphere and is an appropriate condition in the furnace that provides a relatively neutral atmosphere surrounding the silicate glass fragments 210 while in the hot zone of the furnace.

In accordance with an embodiment of the method of the present invention, heating and converting the silicate glass fragments 210 to a plurality of glass microspheres 212 occurs by heating them in a combustion zone inside a fossil fuel-fired furnace, in particular a gas-fired furnace. In such a configuration, the combusting process provides the necessary heat for converting the silicate glass fragments 210 to the hollow glass microspheres 212. In addition, the air-gas mixture entering the furnace, and the combustion flu gases exiting the furnace, provide gas phase transfer for the silicate glass fragments 210, and for the glass microspheres 212 in and out of the combustion zone of the furnace, respectively.

In accordance with the present invention, other heating sources may be employed instead of or in combination with a fossil fuel fired furnace. These heating sources include but are not limited to electric heating, plasma heating, RF heating (microwave), and IR (infrared) heating. The fossil fuels according to the present invention may comprise a variety of gaseous fuels, such as natural gas, propane, liquid fuels, such as heavy liquid fuel oils, distillate fuels, such as kerosene, solid fuels, such as coal and other organic solids, and a combination thereof. The preferred fuel is natural gas, which is readily accessible in the most geographical areas, burns clean, suits the widely available range of burner configurations, and is suitable for co-feeding of solid particles.

In accordance with one aspect of the invention, the gas-fired furnace employed is preferably of the vertical type, in which the combustion of air and gas creates a turbulent combustion zone. As the temperature of the silicate glass fragment 210 reaches the working temperature of the second glass 208 (e.g. working temperature corresponds to a glass viscosity of about 10,000 poise) the fragments assume a viscoelastic state, at which they are capable of entrapping gaseous products being created via the redox reactions or by other means, and are capable to expand. The expansion action forces the silica glass fragments 210 to blow from inside out to form the plurality of hollow glass microspheres 212. Thereinafter, the plurality of hollow microspheres 212 is conveyed out of the furnace by the combustion flu gases. Preferably, a predetermined volume of cooling air is introduced downstream from the combustion zone to cool the glass microspheres 212, while the glass microspheres 212 are being conveyed out of the furnace.

It is important that the softened glass fragments 210 and the newly formed glass microspheres 212 do not impinge on the interior hard surfaces of the furnace. Otherwise, they will adhere to the interior hard surfaces forming a tacky layer that leads to a sticky substrate that encourages further glass build-up during the operation of the furnace. In addition, there should be enough separation distance between the glass particles in the furnace in order to avoid particle-to-particle interaction/impingement to the extent possible; otherwise, the agglomeration of particles becomes a problem. The glass layer buildup on walls or the interior surfaces of the furnace in accordance with one embodiment of the present invention is stopped by providing an air curtain near the wall to keep the particles away from the wall, or by other known techniques. Particle to particle impingement frequency is minimized by reducing the amount of particle loading of the silicate glass fragments 210 in the gas phase, entering and exiting the combustion zone of the furnace.

The plurality of the glass microspheres 212 is immediately cooled after exiting the combustion zone of the furnace in step 112. Cooling air and/or dilution air is introduced inside the furnace downstream from the combustion zone, which cools the glass microspheres rapidly to below the softening temperature of the glass. Additionally, cooling air and/or dilution air may also be introduced in the ductwork after the furnace that is leading to the off-gas treatment system. In the off-gas treatment system, the plurality of hollow glass microspheres 210 is separated from the carrier gases (e.g. flu gas plus dilution air) in cyclones and/or various filtering systems. The plurality of hollow glass microspheres 210 is then cooled to room temperature by appropriate means, collectively in step 112. Mechanical and/or pneumatic means are used for further transport of the glass microspheres 212 to storage areas or to loading stations within or outside the manufacturing facilities. Sampling ports are provided at various locations downstream from the furnace to collect samples of the glass microspheres 212. Samples are analyzed at least for the bulk and particle densities, and percentage of sinkers and floaters. Based on the results revealed by the sample analysis, appropriate corrective actions may be carried out to adjust the desired properties of the spheres, including but not limited to adjusting the firing temperature, the residence time, and the ambient atmosphere in the furnace.

The need and the availability of the RAG components 204 that are added to the first glass melt 206 is ascertained as well by measuring the density of the produced glass microspheres 212. Should the density of the glass microspheres 212 produced be lower, then more gas is necessary to produce a glass microspheres 212 with a lower density. Therefore, as much more RAG components are added to the first glass melt as needed. This is after the firing temperature and the residence time in the furnace are optimized and fixed. As such, RAG components 204 with larger capability of gas generation should be included in the second glass melt 208. The necessary RAG components may be added to the first glass melt 206 in the melter system 300 as one option, and to the batch 200, as another option. One advantage of adjusting the RAG components in the glass melter 300, and specifically, in the processing and/or discharge zones of the melter system 300, as opposed to making a corrective action in the batch 200, is that it takes a significantly shorter turnaround time to accomplish the corrective action on the density of the produced glass microspheres 212. Another advantage is that a relatively low volume of potential glass reject, which is off the desired specification, needs to be dealt with. The capability of adjusting the RAG components 204 in the melter system 300 also makes it possible to manufacture glass microspheres 212 with varying densities on a non-interruptive basis. Hence, the present invention provides a method of adjusting or varying densities of the glass microspheres in a very quick and efficient way via adjustments of the RAG components 204 in the melter system 300. Exemplarily, the particle density of the glass microspheres 212 is a sensed parameter (for example measured by a pycnometer) that is fed back to a control mechanism that adjusts the RAG components (e.g. types and amounts) in a closed or open loop control fashion. The control tactic or methodology is built in an existing empirical database that includes the variation of the sensed parameter (e.g. density) as a function of types and amounts of the RAG components 204. It would be apparent to a person skilled in the art as how such a control mechanism may be implemented, for example manually and/or automatically.

The residence time in the furnace is determined as the average time that the glass fragments spend in the heated zone of the furnace. Therefore, the residence time is calculated as the length of the heated zone of the furnace divided by the linear velocity of the silicate glass fragments 210 travelling through the heated zone. The residence time of the glass fragments in the furnace is within a fraction of a second to less than 10 seconds, and preferably from 0.2 seconds to 4 seconds. However, a residence time outside the range specified above is as well within the scope of the present invention. In general, the residence time is a function of the peak firing temperature and reflective radiative heating inside the furnace, which is controlled by the geometry and operating mode of a firing furnace.

Exemplarily, the furnace may be a vertical furnace that is fed with the silicate glass fragments 208 in an upward, or a downward fashion. It is also within the scope of the present invention to utilize a firing furnace that is not vertically oriented, such as a horizontally oriented furnace, and an inclined oriented furnace. The orientation is defined as the direction parallel to the longest axis of the furnace. An inclined oriented furnace has a non-zero angle between the furnace orientation and the horizontal direction.

In accordance with one aspect of the present invention, the silicate glass fragments 210 resulting from grinding the second glass 208 are substantially free of large gas bubbles, but may contain advantageously micro-sized gas bubbles and/or nucleated micro-bubbles.

Nucleated micron and sub-micron size bubbles (collectively called micro-bubbles) formed within the first glass melt 206 due to the occurrence of non-equilibrium redox reactions comprising any one or a mixture of gaseous $SO_2$, $SO_3$, $O_2$, $CO_2$, $H_2$, $CO$, $N_2$, $NO_X$, $H_2O$, etc., and carried over to the second glass 208 are tolerable in accordance with the present invention. The nucleated micro-bubbles in the second glass 208 are carried through the remainder of the glass pulverizing operations, and eventually are retained within the resulting silicate glass fragments 210. The total volume of the micro-bubbles within a silicate glass fragment 210, compared to the total volume of the silicate glass fragment 210 is relatively small, i.e. several percentage points or less. As the silicate glass fragments 210 are reheated in the furnace to the firing temperature, the nucleated micro-bubbles expand and grow in size, an event that is referred to according to the present invention as "thermal reboil". The growth rate of the nucleated bubbles in the second glass melt 208 becomes significant above 1100° C., and especially between 1200-1500° C. The thermal reboil alone and/or in combination with the other gas generation means, such as physical reboil, redox reactions, and sublimation, leads to the formation of the hollow glass spheres 212. These aspects of the present invention will be explained in detail in the remainder of the present document.

In accordance with another aspect of the present invention, physical reboil, which is also the result of incorporating the RAG components 204 either in the batch 200, and/or to the first glass melt 206 in the melter system 300, contributes as well to the expansion of the silicate glass fragments 210 to hollow glass microspheres 212. The physical reboil process occurs due to changes in the solubility of the chemical species in the glass melt as a function of temperature under atmospheric conditions. The onset and the rate of the physical reboil gas evolution is affected by the composition of the second glass melt 208, as well as by changes in the furnace ambient conditions, that affect the solubilities of dissolved gases in the second glass melt 208. For example, in one embodiment of the present invention, the presence of sulfur as sulfate in the second glass 208 leads to "sulfur reboil" upon heating the silicate glass fragments 210 in the furnace. For example, the solubility of dissolved $SO_3$ in the second glass melt 208 decreases by about 3 orders of magnitude upon heating from 1100° C. to 1400° C. Hence, in the event that the concentration of $SO_3$ in the second glass is such that it exceeds the solubility limit above 1100° C., a physical reboil occurs which is associated with the release of $SO_3$ from the interior of the silica glass fragments 208, resulting in expansion of the silica glass fragments 210, and thus to the formation of the hollow glass microspheres 212. The onset of the physical reboil is also dependent on the equilibrium partial pressure of oxygen in the heating zone of the furnace. The phenomena of the thermal reboil, sublimation, and the physical reboil are referred to further generally as a plurality of events that take place in the melt of the second glass 208.

Aside from the thermal and physical reboils, the present invention relies primarily on the RAG components 204 to provide redox reactions capable of generating gaseous reaction products to expand the silicate glass fragments 210 into the plurality of hollow glass microspheres 212, as it will be disclosed later in more detail.

The chemical reactions occurring in the second glass melt 208 in accordance with the present invention comprise one or more of reactions involving decomposition, oxidation, dissociation, reduction, and recombination of chemical species associated with the RAG components 204. Other forms of gas generation in a melt of the second glass 208 due to physical events or processes such as nucleation, saturation, evaporation, and sublimation are also within the scope of the present invention, and are considered under the category of the plurality of events. Irrespective of how the gas is generated, the gaseous products as they are being generated are either trapped, or entrapped, or entrained, or a combination thereof in the second glass melt 208 from which the silicate glass fragments 210 are formed, and aid in forming the plurality of hollow glass microspheres 212.

Preferred RAG components 204 in the batch 200 comprise sulfur (in the form of one or more of sulfates, sulfites, and sulfides), multivalent metals, and transition metals in the form of compounds and chemical species, and various carbonaceous materials including carbon itself. As mentioned earlier, RAG components 204, in the form of gaseous, liquids, aerosols (solids and/or liquids) may be mixed, or injected, or purged, or bubbled, or a combination thereof, into the first glass melt 206. Common gaseous reaction products generated during RAG components redox reactions (also referred to as RAG reactions) include $SO_3$, $SO_2$, $H_2S$, $CO_2/CO$, $H_2O$, $O_2$, $NH_3$, and $NO_X$. Other gaseous species that might be present, such as entrapped air, and nitrogen are not considered a direct gaseous reaction product. All the gaseous reaction products can be also used as gaseous RAG components to be purged or bubbled inside the first glass melt 206 in addition to those listed before.

$CO_2$ and/or CO gas is released during the decomposition of carbonates, and/or due to oxidation of carbonaceous materials of the RAG components 204. The carbonaceous materials of the RAG components 204 include bonded carbon (in organic substances), unburned carbon (UBC) that is found in thermally processed industrial byproducts, graphite, carbide, coke, anthracite, carbocite, loose carbon powders, etc.

Sulfur containing gaseous reaction products are present when sulfates/sulfites/sulfides are included as a part of SGP raw materials 202 and/or the RAG components 204. According to the present invention, all the sulfate/sulfite/sulfide ions, multivalent and transition metal ions, and carbonaceous materials either in elemental or compound forms, other than carbonates in the resulting first glass melt, are considered to be the constituents of the RAG components 204, regardless of having been introduced intrinsically with the SGP raw materials 202, and/or with the RAG components 204.

With respect to the sulfur portion of the RAG components 204, it is of note that sulfur solubility is sensitive to the oxidation state of the first glass melt 206. Under reducing conditions, sulfur dissolves as sulfide ions, and as sulfate, while under oxidizing conditions. The reduction of the oxygen partial pressure inside or outside the first glass melt 206 shifts the equilibrium between sulfide and sulfate towards sulfide, with a reduction in overall sulfur solubility, resulting in degassing the first glass melt 204 by releasing $SO_2$. Hence, the sulfide solubility is generally lower than the sulfate solubility in the first glass melt 206. Changes in the chemistry of the first glass melt 206 also alter the overall sulfur solubility (sulfates and sulfides are referred to in general way as sulfur). In addition, the overall sulfur solubility depends on the first glass melt 206 temperature, since the sulfate solubility decreases with increasing the temperature, while the solubility of sulfide increases with increasing the temperature. Therefore, changes of temperature of the first glass melt 206 affect the concentration of sulfur, in the forms of sulfate and sulfide, in opposite directions.

For example, to yield sulfides from sulfate in the first glass melt 206, (since the source of sulfur in the RAG component 204 is primarily sulfate), a reducing RAG component, such as carbon, is included in the batch 200, and/or directly introduced into the first glass melt 206 while inside the melter system 300. Since redox reactions are time and temperature dependent, according to the embodiments of the present invention, a desired balance between the concentrations of sulfide and sulfate in the first glass melt 206 is achieved by adjusting the residence time of the first glass melt 206 in the melter system 300. Said adjustment may be performed to adjusting the redox state of the first glass melt 206, that is controlled by the introduction of additional RAG components 204 directly to the first glass melt 206, and the ambient conditions of the melter system 300.

In accordance with one aspect of the present invention, the plurality of redox reactions comprise the reaction of sulfates with sulfides in the second glass melt 208.

The solubility of sulfur decreases with decreasing the alkali content of the first glass melt 206. The amount of sulfate ions (as $SO_4$) in the first glass melt 206, according to the present invention, is typically less than 5 wt % based on a combined mass of batch 200 that includes both the SGP raw materials 202 and the RAG components 204. The solubility of sulfate as $SO_4$ in a typical first glass melt 206 according to the present invention is from about 0.2 to about 2.0 wt % based on the mass of the first glass 206. Alkali sulfates, when present in the batch 200, melt at a temperature of around 900° C., and remain in the first glass melt 206 as sulfate under an oxidizing condition until appreciable decomposition starts to occur, at or above 1100° C. In a continuous melting operation, the temperature rise occurs in the cold cap region, whereby the temperature of the fresh batch 200 on the top is considerably cooler than the batch temperature that is near the molten glass underneath.

In the presence of reducing components in the RAG components 204, such as the presence of unburned carbon, the decomposition of sulfates occurs at a lower temperature, e.g. around 800° C.

Should an oxygen sink, internal or external to the first glass melt 206, or an oxygen getter, enter the first glass melt 206 as a part of the gaseous RAG components 204, the oxygen from the sulfate ion is consumed and/or scavenged in the first glass melt 206, and $SO_2$ gas is released. The results may be interpreted in terms of sulfate solubility and non-equilibrium effects. For example, when a multivalent metal ion, such as iron, is present as a part of the RAG components 204, both reduced and oxidized forms of sulfur (e.g. sulfate and sulfide), and iron (e.g. ferrous and ferric) may coexist in the first glass melt 206, and subsequently in the second glass melt 208 that forms the silicate glass fragments 210, as a result of the non-equilibrium redox reactions taking place in the first glass melt 206.

According to an embodiment of the present invention, a composite redox value, calculated based on a concentration of the at least one electron donor component and on a concentration of the at least one electron acceptor component in said first glass 206, is used to determine the amounts and types of the RAG components that are to be incorporated into the first glass 206. In addition, when the entire quantity of RAG components 204 is not incorporated from the beginning into batch 200, the composite redox value takes into account any RAG components 204 in any forms that are to be incorporated into the first glass melt 206 within the melter system 300, in addition to taking into account the amounts added in the batch 200.

Exemplarily, when the RAG components 204 are incorporated directly into the first glass melt 206, normally the rate of their addition is reported as a mass flow rate. One way to convert the mass flow rate to concentration is as follows: Since the mass of glass produced per unit time is generally known, then the wt % of a particular RAG component on a mass basis of the first glass melt 206 is calculated as:

$$(M_{RAG}*100)/(M_{Glass}-M_{RAG})$$

where, $M_{RAG}$ is the mass flow rate of the particular RAG component in kg/hr, and $M_{Glass}$ is the mass of glass produced in kg/hr, prior to incorporation of the particular RAG component. Different units for mass flow rate may be used, however, the unit used has to be the same unit as the one used for reporting the mass of the glass produced per unit time.

The composite redox value is calculated based on concentrations of the RAG components 204 in the first glass melt 206. As mentioned earlier, the RAG components 204 overall are either electron donors or acceptors. To calculate the composite redox number, factors are assigned to the corresponding concentrations of the RAG components 204 in the first glass 206, in wt %. The factors are: for carbon as elemental carbon (−7.0), for sulfate as $SO_4$ (+0.5), nitrates as $NO_3$ (+0.2), and sulfides as S (−0.6). Should other components be present in the RAG 204 a skilled person would know how to assign the applicable coefficients to said components based on tables available in the art. In the above example, a positive factor indicates an oxidizing chemical species, and a negative factor indicates a reducing chemical species. For example, in a situation whereby the first glass melt 206 comprises approximately 2 wt % sulfate as $SO_4$, and 0.4 wt % carbon, as C, the composite redox number is calculated as:

Composite redox number=2*(+0.5)+0.4*(−7.0)=−1.8.

According to the present invention, the composite redox number of the first glass melt 206 is negative, preferably between −0.05 to −20, and more preferably between −0.1 to −10. As such, the composite redox value of the redox active group components is less than zero. In other embodiments of the invention the composite redox value is equal to zero.

According to various embodiments of the present invention, sulfates, may be in the form of alkaline earth metal sulfates, such as calcium and magnesium sulfates, alkali metal sulfates such as sodium and potassium sulfates, multivalent, and transition metal sulfates, such as zinc, copper and iron sulfates, and a combination thereof. The term "sulfates" encompasses sulfites, bi-sulfite, and bi-sulfates. The solid sulfides, in general may be in the form of any metal sulfides, preferably in the form of multivalent, and transition metal sulfides, such as zinc and iron sulfides. Bounded sulfides from slag, and iron pyrite $FeS_2$, other stable metal sulfides, may be used as well. Gaseous hydrogen sulfide is a source of sulfide directly incorporable into the first glass melt 206 while in the melter system 300. The slag resulting from some incineration processes (e.g. municipal waste incineration) is an economical source of sulfides, with the majority of sulfide being in the form of iron sulfide. Iron pyrite in most cases loses one sulfur atom at relatively low temperatures, which combines with oxygen and is being released as $SO_2$ from the batch at a relatively low temperature, e.g. below 800° C.

According to the embodiment of the present invention, wherein essentially all the RAG components 204 are incorporated into the batch 200, as a general guideline, the concentrations of several common RAG components 204 in the batch 200 in weight percentage based on the mass of the first glass 206 are as follows: sulfates, calculated as $SO_4$, from 0.1 to 5 wt %, sulfides, calculated as S, from 0 to 2 wt %, carbonaceous materials, calculated as C, from 0 to 3 wt %, multivalent metal oxides from 0.1 to 20 wt %, and for nitrates/nitrites/nitrides, calculated as N, from 0 to 2 wt %. All or a portion of the RAG components comprising sulfates and multivalent oxides are preferably incorporated into the first glass melt via the batch 200, while other RAG components 204 are incorporated either via the batch 200, and/or via direct addition to the melter system 300, depending on a target composition of the RAG components 204 in the second glass 208.

A transition metal present in the RAG components 204, according to an embodiment of the present invention, is iron. Ferric ion based on its ionic potential is a weak acid in the glass network, meaning that it can participate in the glass network in a similar manner with aluminum and boron ions. On the other hand, ferrous ion is a base and has the tendency to donate electrons to the glass network (in particular to the oxygen ions), similarly to calcium and magnesium ions. In terms of glass structure, ferrous ion acts as a glass network modifier lowering the viscosity of the glass, whereas ferric oxide in most cases becomes a part of the glass network formers, leaving the viscosity practically unchanged or slightly higher. In terms of glass making, lowering the viscosity of a glass is normally associated with lowering the melting temperature of the glass.

According to one embodiment of the present invention, in order to lower the melting temperature of the second glass 208 compared to the first glass 206, an increase in the concentration of ferrous oxide relative to the total concentration of iron, as iron oxide in the second glass 208 takes place. This is accomplished by in-situ formation of ferrous oxide from the iron compounds present in the second glass melt 208 in the process of producing hollow glass microspheres. Since the first glass melt 206 is the precursor to the second glass 208, the relative concentration of the iron compounds in the first glass melt is adjusted in the melter system 300 by incorporating the appropriate RAG components 204 into the first glass melt 206. The RAG components 204 are incorporated into the first glass melt 206 in the form of gases, vapors, liquids, solids, aerosols and a combination thereof. The incorporation of the RAG components 204 into the first glass melt 206 while in the melter system 300, is carried out by one or a combination of blending, injection, bubbling, spraying, dipping, and stirring in an appropriate section/compartment of the melter system 300, including the melting zone 310, the processing zone 320, discharge zone 330, or in a combination thereof. In one exemplary embodiment, the first glass melt 206 is melted under neutral melting conditions, and as such, the majority of iron in the first glass melt 206 remains in the ferric form in the glass pool within the melting zone 310. At least one reducing RAG component 204 is introduced into the first glass melt 206 while in the processing zone chamber 320. The reducing RAG component 204 may be selected from a variety of fluids and/or solids, for example an aerosol of carbon particles in air, a hydrocarbon gas such as acetylene, hydrogen sulfide, hydrogen/nitrogen mixtures, and alike. The reducing RAG component 204 is bubbled, injected, or sprayed into the first glass melt 206 in the processing zone 320 of the melter 300 or the discharge zone 330 depending on the desired residence time associated with the non-equilibrium redox reactions involved. By proceeding this way, the relative concentration of the iron compounds in the first glass melt 206 is adjusted, and/or residual carbonaceous materials are introduced into the glass melt 206, as another source of gas formation while producing the hollow glass microspheres 212.

Accordingly, during thermally processing the glass fragments 210 in step 110 to produce the plurality of glass microspheres 212 the concentration of cationic ferrous iron in the second glass melt 208 is increased. Consequently, the viscosity of the second glass melt 208 is lowered, and so is the melting temperature of the second glass melt 208, by comparison with the melting temperature of the first glass melt 206.

According to another embodiment of the present invention, to shift the balance of iron to ferrous oxide, a portion of the sulfate comprised in the RAG components 204 is converted to sulfide in the first glass melt 206. One method to accomplish this shift is by including carbonaceous materials, such as carbon, in the RAG components 204, by either incorporating them in the batch 200, and/or directly into the first glass melt 206 in the melter system 300. Carbon, as a part of the carbonaceous materials, scavenges oxygen primarily from sulfate/sulfites during the non-equilibrium redox reactions and in the process forms iron sulfide, $CO_x$, and possibly $SO_2$. In one embodiment elemental sulfur as a part of the RAG components 204 is incorporated in the same manner as described in connection with the carbon example above into the first glass melt, which results in the formation of iron sulfide in the first glass melt 206. In another embodiment, iron sulfide and/or iron pyrite as a part of the RAG components 204 is incorporated, in the same manner as described in connection with the carbon example disclosed above into the first glass melt, which also results in the formation of iron sulfide in the first glass melt.

In accordance with other embodiments of the present invention, similar chemical species to the sulfate-sulfide pair may also be used in the same manner as described above in connection with the sulfate-sulfide pair. An example is the selenite-selenide pair, $SeO_3^{2-}$—$Se^{2-}$.

Exemplarily, the redox reaction involving ferric iron and carbon from a carbonaceous source in the first glass melt 206 is carried out in a non-equilibrium manner to convert less than 80% of the total iron to ferrous iron (e.g. ratio of ferrous iron to total iron less than 0.8). To accomplishing the above, the parameters that need to be controlled include: the type and concentration of the RAG components to be incorporated into the first glass melt 206, the melting time/residence time of the first glass melt 206 in the melter system 300, the agitation/bubbling rate and methods applied to the first glass melt 206, and the redox environment of the melter system 300. As a result of the non-equilibrium redox reactions in the first glass melt 206, the preferred RAG components 204 reaction products, and chemical species that remain in the second glass 208 preferably comprise at least one of sulfide, sulfate, carbon compound, and iron. Other oxidizing and reducing chemical species analogous to sulfur compounds, multivalent metals, and other transition metals can be used in addition or instead of sulfur compounds and iron for the same purposed.

According to the present invention, the conversion of the first glass melt 206 into the second glass 208 occurs outside the melter system 300. The conversion occurs when the first glass melt 206 is cooled to form the second glass 208. Hence, in a broad scope, the glass being discharged from the melter system 300 is essentially the first glass melt 206 being converted to the second glass 208. It is also possible to characterize the composition of the second glass melt 208 as being essentially the same glass composition as being discharged from the melter system 300. Further, the composition of the silicate glass fragments 210 is essentially the same as the composition of the second glass 208, and wherein the second glass 208 has been fragmented.

In accordance with one embodiment of the present invention, sulfides are introduced into the batch 200 as part of the RAG components 204. For example, iron sulfide is provided as part of the RAG components 204 either by introducing into the batch 200 or by forming it in-situ in the melter system 300 by bubbling hydrogen sulfide in the first glass melt 206. This is similarly the case as well for ferrous iron, ferric iron, and sulfate/sulfites that may be incorporated in the first glass melt 206 as a part of the RAG components 204, to provide the desired concentration of iron sulfide, ferrous-ferric ions, and sulfate ions to be carried over into the second glass 208.

The sulfur in the RAG components 204 that is introduced to the batch 200 is provided from one or more of salt cake, gypsum, metal sulfates and bi-sulfates, iron pyrite, slag, fly-ash, bottom ash, and other waste byproducts and recycled materials. In addition or alternatively, a sulfur source may be introduced into the melter system 300 and be incorporated into the first glass melt 206, to compensate or replace the source of sulfur in the batch 200. The sources of RAG components to the first glass melt 206 according to a broader scope of the present invention, may be supplied either to the batch 200, or by direct incorporation into the first glass melt 206 while in the melter system 300, or both.

According to the present invention, the sulfide to sulfate ratio (e.g. $S^{2-}/SO_4^{2-}$) in the second glass 208 affects the viscosity of a second glass melt 208 as related to the ratio of $Fe^{+2}/Fe$ (Fe represent total iron in the glass). The reaction between sulfide and sulfate in the second glass 208 provides the gaseous reaction product(s) required to form the hollow glass microspheres 212 in step 110. In the presence of multivalent metal cations, such as iron in the second glass 208, as the molar ratio of sulfide to sulfate is increased, the ratio of $Fe^{+2}/Fe$ (total) is also increased.

According to the present invention, due to the non-equilibrium redox reactions taking place in the first glass melt 206, it is possible to create iron sulfide in situ co-existing with the sulfate in the first glass melt 206. The combination of sulfide-sulfate is carried over to the second glass 208, and it has simultaneously the double advantage of providing gaseous reaction products that serve to manufacture hollow glass microspheres 210 from the molten silicate glass fragments 208, and of lowering the melting temperature of the second glass melt 208. The redox reaction between iron sulfide and sulfate in the second glass melt 208 of the silicate glass fragments 210 provides the network modifier/flux of ferrous oxide that lowers the melting temperature of the second glass 208, as compared to the melting temperature of the first glass 206, without sacrificing the chemical durability of the resulting plurality of the glass microspheres 210.

The decomposition of sulfates while melting the first glass 206, without and with the presence of carbon is presented in reactions (1) and (2), respectively:

$$SO_4^{2-} \leftrightarrow SO_3 + O^{2-} \tag{1}$$

$$SO_4^{2-} + C \rightarrow SO_2 + CO + O^{2-} \tag{2}$$

As it may be observed above in accordance with the reaction (1), the sulfate ion $SO_4$ decomposes into sulfur trioxide $SO_3$ and one oxygen ion (e.g. $O^{2-}$). This reaction occurs in the absence of reducing components. However, when a reducing component, such as carbon, is present in the RAG components 204, the sulfate ion in combination with carbon follows reaction (2), whereby it decomposes into sulfate dioxide $SO_2$, an oxygen ion, and CO. The reaction (2) is generally the rate-controlling step for reaction (1), requiring a reducing component such as carbon. In a situation when an oxidized multivalent metal oxide is also present as a part of the RAG components 204, the oxygen required to oxidize a reducing component is primarily supplied by sulfates in the first glass melt 206 as a primary source, and by the multivalent metal oxide, such as ferric oxide, as a secondary source. As the melting of the batch 200 into the first glass melt 206 progresses, the carbon first reduces the sulfates to gaseous $SO_2$, and secondly, ferric iron to ferrous iron, and in the process the negative redox ratio of iron ($Fe^{+2}/Fe$ total) increases. In the process, depending on the amount of carbon available in the first glass melt 206, sulfides may also form in the first glass melt 206 according to following reaction:

$$SO_4^{2-} + 2C \rightarrow S^{2-} + 2CO_2 \tag{3}$$

If in the process of the oxidation of carbon, according to the reaction (3), CO is also created, the following reaction takes place, when sulfate ion or other oxygen sources are available in the first glass melt 206:

$$SO_4^{2-} + 4CO \rightarrow S^{2-} + 4CO_2 \tag{4}$$

Reaction (3) is analogous to reaction (2), with the exception that the molar ratio of carbon to sulfate ion is two times larger. Reactions (3) to (4) are redox reactions presenting the in-situ creation of sulfides in the first glass melt 206. As previously disclosed, the carbon is provided by the RAG components 204, included either in the batch 200, and/or incorporated into the first glass melt 206 while processing in the melter system 300.

The reactions (3) and (4) may be fashioned with iron as the multivalent metal cation in combination with the sulfide ion. In accordance with the present invention, it is possible that other multivalent metal ions present in the first glass melt 206 also participate in conjunction with the ferrous/ferric ions in the above reactions.

It is also possible to incorporate elemental sulfur into the first glass melt 206, which reacts with the metal ions present in the first glass melt 206 to produce sulfides. The reactions (3) and (4) above demonstrate that carbon is capable to shift the overall valence state of the sulfur from sulfate (also sulfite) to sulfide. These reactions occur at a temperature above 900° C. One advantage of incorporating carbon into the first glass melt 206 while in the melter system 300 is that the first glass 206 is melted in the melting zone 310 under neutral or in fact oxidizing conditions in order to prolong the life of the electrodes, and contact refractories. The incorporation of carbon is subsequent to the melting process and is carried out in the processing zone 320 of the melter system 300, which in accordance with one embodiment of the invention is substantially isolated from the melting zone 310. In the melter system 300, the zones are designed such that the first glass melt 206 flows substantially in a one-way direction from the melting zone 310 to the processing zone 320, and from the processing zone 320 to the discharge zone 330. In a situation where a molten salt layer comprising sulfates is formed over the first glass melt 206, the sulfate layer is reduced to primary $SO_2$ gas with the incorporation of a carbonaceous RAG component directly into the glass melt 206 while the melter system 300.

According to the present invention, the redox reactions (3) and (4) occurring in the first glass melt 206 are terminated before reaching equilibrium and/or completion. As it was disclosed previously, it is advantageous to have a combination of sulfate and sulfide (e.g. sulfate-sulfide pair) in the second glass 208 for the purpose of providing gaseous reaction products that serve to manufacture hollow glass microspheres 210 from the molten silicate glass fragments 208, and for the purpose of lowering the melting temperature of the second glass melt 208. The termination of the redox reactions is achieved by discharging the first glass melt 206 from the melter and allowing the glass to cool down rapidly. The viscosity of the glass increases exponentially with decreasing temperature, and as such the redox reactions come to a stop quickly as the discharged glass is cooled and solidifies. The extent by which the non-equilibrium redox reactions advance towards completion is controlled by the residence time of the first glass melt 206 in the melter system 300. Since the redox reactions are stopped before reaching equilibrium in the first glass melt 206, the non-equilibrium redox reactions reactants, and the reaction products in the solidified first glass melt 206 are carried over into the second glass 208 from which the silicate glass fragments 210 are made. In accordance with the present invention, the cooled and solidified first glass melt 206 is defined or characterized as the second glass 208.

In the thermal processing step 110, the silicate glass fragments 210 are rapidly heated inside the firing furnace to the melting temperature of the second glass 208. The following chemical reaction occurs in the second glass melt 208:

$$3SO_4^{2-} + S^{2-} \rightarrow 4SO_2 + 4O^{2-} \tag{5}$$

Reaction (5) requires that both sulfide and sulfate ions are present in the second glass 208. The cations of the two anionic species may be the same or different. As disclosed before, iron is an example of a cation for the sulfide anion, but other multivalent metal cations are as well within the scope of the present invention, such as zinc, copper, and tin. For example, when iron sulfide is present, the reaction (5) is:

$$3SO_4^{2-} + FeS \rightarrow 4SO_2 + FeO + 3O^{2-} \tag{6}$$

Reaction (6) can be rewritten as well for ferric sulfide; however, it is believed that the majority of the iron sulfide is present as ferrous sulfide in the glass second melt 208 in the furnace. As disclosed previously, the resulting ferrous oxide behaves like a glass network modifier, resulting in the depolymerization of the melt and in lowering the viscosity of the second glass 208 compared to the first glass 206. The reaction (6) in most cases has an onset temperature of about 1050° C., and a near completion temperature of about 1600° C., with a peak rate at about 1350° C.-1550° C., depending on the furnace atmosphere, and the chemical composition of the second glass 208.

The present invention, as illustrated in the chemical reaction (6), is capable of providing the double advantage of lowering the melting temperature of the second glass 208 (e.g. lowering the viscosity), by in-situ generating fluxing ferrous iron, while simultaneously forming the ample volume of sulfur dioxide gas that is necessary for the creation of the plurality of hollow glass microspheres 212 from the silicate glass fragments 210.

In case that there are more sulfide ions in the second glass melt than the stoichiometric ratio of the reaction (5) with respect to the sulfate ions present, a portion or all the excess sulfide goes through an oxidization reaction according to reaction (7), as follows:

$$2FeS + 3O_2 \rightarrow 2FeO + 2SO_2 \quad (7)$$

According to the reaction (7), additional expansion gas, e.g. $SO_2$, and additional fluxing oxide (e.g. FeO) is produced by an oxidation reaction of sulfide in the second glass melt 208.

An additional source of expansion gas in the second glass melt 208 while in the furnace is from un-reacted carbon carried over from the first glass 206 to the second glass 208. The un-reacted carbon reacts with the sulfate, and/or other oxidizers in and out of the molten silicate glass fragments 210 (e.g. second glass melt 208). The reaction is similar to the reaction (2), and results in forming $SO_2$, and $CO_x$ ($1 \leq x \leq 2$). The oxygen from the combustion air inside the furnace is an external source of oxidizer.

The physical reboil of $SO_2/SO_3$ which may occur in the furnace at the same time with reaction (7) also adds to the total volume of gas created and available for further expanding the silicate glass fragments 210 to hollow glass microspheres 212. The physical reboil is triggered in the second glass melt 208, by exceeding the solubility limitations of the sulfur oxide gases in the second glass melt 208.

In accordance with another embodiment of the present invention, a predetermined amount of carbon, e.g. residual carbon, is allowed to remain in the first glass melt 206. This is carried out preferably by directly incorporating a carbonaceous RAG component 204 in the first glass melt 206, while in the melter system. Optionally, this can be accomplished via residual carbon carried over from the RAG components 204 that were included in the batch 200. The advantage of having residual carbon is that this residual carbon consumes any remaining sulfate, according to reaction (3), thus creating $CO_2$ gas that is utilized further for the expansion of the silicate glass fragments 210. In addition, any sulfide formed, after the exhaustion of the residual carbon, is oxidized by oxygen in the furnace to provide additional $SO_2$ also being utilized for the further expansion of the silicate glass fragments 210 to hollow glass microspheres 212. Finally, when both ferric and ferrous iron are present in the melt of the second glass 208 of the silicate glass fragments 210, residual carbon promotes the reduction of ferric iron to ferrous iron and the creation of $CO_2$ gas in the process. Again, the created $CO_2$ gas is a source of gas available to expand the silicate glass fragments 210 to hollow glass microspheres 212. Since the majority of iron would be in the form of ferrous iron, a significant reduction in the melting temperature of the second glass 208 is attained compared to the melting temperature of the first glass 206. Carbon carry over into the second glass 208 is possible, because of the ability to incorporate carbon at the stage of the melt processing in the melter system 300. As such, the carbon impregnated first glass melt 206, resides only a short time in the melter system 300 before being discharged and cooled. As a result, the carbon is not fully consumed in the first glass melt 206 and is carried over into the second glass 208. This is another example of a non-equilibrium redox reaction occurring in the first glass melt.

Providing a first glass melt 206 with any other short lived chemical species while in a molten state is accomplished by impregnating the first glass melt 206 in the processing zone, and/or discharge zone of the melter system 300 with the desired short lived chemical species. This allows the chemical species to be carried over to the second glass 208. The impregnation is achieved by incorporating a desired chemical species, such as for example carbonaceous materials, into the first glass melt 206 while in the melter system 300. As previously disclosed the incorporation is realized by various methods including bubbling or injecting the chemical species in the melter system 300 in such zones like the processing zone 320, and the discharge zone 330 of the melter. The chemical species will undergo a targeted reaction when the second glass is reheated and is melted.

The sulfate redox reactions involving carbon (e.g. added as a part of the RAG components to the batch 200 and/or in the form of gaseous, liquid, solid carbonaceous materials and aerosols bubbled and/or injected into the first glass melt 206) are influenced by the relative concentration of carbon to sulfates, the reaction time, and the melt temperature.

In accordance with the present invention, direct conversion of sulfates to sulfides is achieved in the first glass melt 206 while in the melter system 300 by incorporation of a carbonaceous chemical species such as carbon into the first glass melt 206.

In the case that carbon is not totally consumed in the first glass melt 206 due to the non-equilibrium redox reactions, as disclosed previously, a portion of the unreacted carbon will be carried over to the second glass 208 as the residual carbon.

In accordance with the present invention, and the above disclosure, there is more than one source of gas formation within the second glass melt 208 during the expansion of the silicate glass fragments 210 to the hollow glass microspheres 212. Thus, it is possible to increase or decrease the volume of gas created during the expansion of the silicate glass fragments 210 in such a way to obtain the desired average particle density of the corresponding hollow glass microspheres 212. As disclosed above, as the concentration of sulfides and residual carbon are increased in the second glass 208 via non-equilibrium redox reactions induced in the first glass melt 206, a larger volume of expansion gas is generated in the second glass melt 208 resulting in lowering the particle density of the hollow glass microspheres 212 to very low values, e.g. below 0.4 g/cc. According to one aspect of the present invention, the combined volume of gas generated in the second glass melt 208 causes the silicate glass fragments 210 to expand, and is due to more than one gas forming chemical species simultaneously and more than one gas generation mechanisms generating gas in the molten silicate glass fragments 210 en-route to the hollow glass microspheres 212.

As the ratio of carbon to sulfate increases in the RAG components 204, under equilibrium conditions, more sulfate is consumed to form sulfides and/or $SO_2$. However, depleting the sulfate completely from the first glass melt 206, and consequently from the second glass 208 is not recommended, otherwise reaction (5) might not take place in the second glass melt 208. Henceforth, the non-equilibrium redox reactions are important to take place in the first glass melt 206.

As disclosed previously, and in accordance with the present invention, the volume rate of gases generated in the second glass melt 208 within the silicate glass fragments 210 is in a direct relationship with the particle density of the resulting plurality of hollow glass microspheres 212, e.g. the higher gas generation volume rate, the lower particle density.

The advantages provided by the method of the present invention are evident, as the amount of gas created during the expansion of the silicate glass fragments 210, employed for the creation of the glass microspheres 212, is precisely controlled by controlling the concentrations of sulfides, sulfates, and residual carbon in the second glass 208. In addition, the amount of ferrous iron oxide created in the second glass 208 due to redox reactions as disclosed previously affects the melting temperature of the second glass 208 and as such the melting temperature of the silicate glass fragments 210 in step 110.

In the event that either or both thermal and physical reboils phenomena are also present, the firing temperature and the residence time in the furnace are also adjusted to control the total volume of gas generated in glass melt of the second glass 208 by measuring the average particle density of the hollow glass microspheres 212.

One method of evaluating the necessary process parameters, such as the types and amounts of RAG components 204, the residence times in the melter system 300 and the firing furnace, melting and firing temperatures, requires measuring at least one of the particle density, the mechanical strength, the chemical durability, and other physical and chemical characteristics of the glass microspheres 212.

For example, one measurement data set is appropriately arranged (i.e. graphically or tabulated) to show the results of measuring the particle density of the glass microspheres 212 as a function of the firing temperature for a given residence time inside the firing furnace. A second set of data is arranged to show the results of measuring the particle density of the glass microspheres 212 as a function of the residence time for a given firing temperature. Another example is related to the hydrostatic pressure and/or crushing strength of the hollow microspheres 212 as a function of particle density. Other such representations may be as well performed apart from the ones exemplarily specified above, to aid with the evaluation of the necessary process parameters and to learn regarding any necessary changes in said parameters.

Exemplary for a desired hydrostatic pressure rating and/or crushing strength of the glass microsphere 212, a corresponding targeted particle density is determined from the data representation. To affect the particle density of the glass microspheres 212, the important processing parameters are the residence time in the heated zone of the furnace, the temperature of the heated zone of the furnace, and the volume of gas being generated in the second glass melt contained in the molten silicate glass fragments 210 while in the furnace. In practice, the residence time is not significantly variable, since the length of the furnace is fixed. The linear velocity of the silicate glass fragments 210 inside the furnace can be varied some, as the volumes of the combustion air and gas entering the furnace for a given solid loading, may vary but not significantly. Optionally the firing temperature may be varied, which affects the volumes of the combustion air and gas. However, the preferred option in accordance with the invention is to affect the volume of gas being generated within the second glass melt 208, by adjusting the types and concentration of the RAG components 204 in the melter system 300 as discussed in detail previously in connection with the capability to manufacture glass microsphere 212 with varying densities.

As previously discussed, the plurality of sulfide compounds are either included as part of the RAG components 204 entering the batch 200 from which the first glass melt 206 is created, or alternatively are formed in-situ in the first glass melt 206 while residing inside the melter system 300. In accordance with the present invention, the concentration of total sulfides, calculated as $S^{2-}$ in the second glass 208 is from 0.001 to 2 wt % based on the mass of the second glass 208.

In accordance to the present invention, the molar fraction of sulfide (as $S^{2-}$) over total sulfur ($S^{2-}+SO_4^{2-}$) in the second glass 208 is greater than zero.

The atmosphere within the furnace employed for heating and expanding the silicate glass fragments 210, in accordance with the present invention, is controlled to be either neutral, oxidizing, or reducing. When the furnace is operated under neural to mildly reducing conditions the relative concentration of thermal NOx in the flu gases is decreased, which is environmentally advantageous. Another advantage of the present invention is due to having the ability to lower the melting temperature of the second glass 208 compared to the first glass 206. Yet another advantage of the present invention is the ability to generate gas in the second glass 208 from multiple sources. All the advantages above lead to the ability of lowering the firing temperature requirements for the second glass that in turn results in improving the fuel efficiency of the manufacturing process, and hence the ability of economically manufacturing high quality hollow glass microspheres 212.

The sulfide compounds of the RAG components 204 include both synthetic and mineral compounds of sulfides. According to the present invention, in addition to or instead of sulfides, selenides, antimonides, bismuthinides, and sulfosalts may also be used, but they are normally more costly than the synthetic and mineral compounds of sulfides containing $S^{2-}$. Examples of the sulfide compounds that are used according to the present invention are one or a combination of acanthite $Ag_2S$, chalcocite $Cu_2S$, bornite $Cu_5FeS_4$, galena PbS, sphalerite ZnS, chalcopyrite $CuFeS_2$, pyrrhotite FeS, millerite NiS, pentlandite $(Fe,Ni)_9S_8$, covellite CuS, stibnite $Sb_2S_3$, pyrite $FeS_2$, molybdenite $MoS_2$, and other metal and transition metal sulfides. Iron sulfide, with the general formula $Fe_{1-x}S$, is one sulfide compound to be used according to one embodiment of the present invention, wherein x varies from zero to 0.5. Iron sulfide, for example, in the form of pyrite, is readily commercially available at relatively low cost. Another source of iron sulfide is from vitreous, semi-vitreous, or crystalline industrial byproducts such as incineration slag, incineration ash, bottom ash, and flyash. Ferric sulfide is also acceptable.

In accordance with one embodiment of the present invention, all or a portion of the materials that constitute the batch 200 are derived from recovered materials. As disclosed earlier in this document, the "recovered materials" are waste materials, either of hazardous or non-hazardous nature. Converting non-hazardous recovered materials to hollow glass spheres provides a highly value added product, while preserving natural resources, by decreasing the demand for mined raw materials. Exemplarily, asbestos containing waste materials, in accordance with the present invention are melted as a part of the batch 200 into the first glass 206 in the melting zone 310. Any adjustments to the RAG components are carried out either via batch 200 and/or inside the melter system 300 such as in the melting zone 310, the processing zone 320, and the discharge zone 330. In this way, not only a hazardous waste material is safely vitrified, but also the resulting vitrified material forms a second glass 208, which is suitable to be converted to high quality glass microspheres 212. The embodiment of the invention disclosed above for the asbestos containing waste materials is equally applicable for other waste materials, such as incineration ash, radioactive waste materials, and any other vitrifiable waste materials.

In accordance with one embodiment of the present invention, a vitrified waste material that has a combination of RAG components and/or RAG components reaction products, such as at least one sulfur compound, and a multivalent metal, is used directly as the second glass 208 from which silicate glass fragments 210 are made. Accordingly, the vitrified waste material is pulverized and sized in step 108, forming the plurality of silicate glass fragments 210. The resulting silicate glass fragments 210 are heated in step 110 to form glass microspheres 212, which in this case are directly produced from pulverization of a vitrified waste material. Exemplary vitrified waste materials to be used as the second glass 208 are: vitrified asbestos waste materials, vitrified hazardous waste materials, vitrified radioactive waste materials, vitrified incinerated municipal waste materials, vitrified incineration ash, and vitrified medical waste materials.

Converting hazardous materials into non-hazardous recovered materials, and then into glass microspheres provides better handling, more efficient storing, and the possibility of reuse of the recovered materials. Examples of a non-hazardous (land fillable) industrial byproducts are fly ash, bottom ash, and in some cases incineration ash. Examples of hazardous materials converted into non-hazardous recovered materials and consequently into glass microspheres, are asbestos containing waste materials, and medical/municipal waste materials that are vitrified into essentially non-hazardous glassy materials. Another example of a hazardous industrial byproduct is vitrified nuclear waste that despite being considered radioactive, the radioactive isotopes contained in it, are securely fixed into the molecular structure of the glass, resulting in glasses that are chemically very durable and physically highly stable. The vitrified nuclear waste glass is used as the second glass 208 in accordance with the present invention to manufacture radioactive glass microspheres. Most of the vitrified low-level nuclear glasses contain RAG components 204, in the form of iron oxide, and sulfur compounds. The glass microspheres 212 are essentially solid when there is not sufficient gas forming RAG components 204 present. On the other hand, the microspheres are hollow when there are sufficient gas forming RAG components 204 present. The resulting glass microspheres find uses in many applications, including radiation source miniaturization, medical applications, etc.

According with an embodiment of the present invention, the vitrified hazardous waste materials are used instead of batch 200 to create the first glass 206. In certain cases when sufficient RAG components 204 (or RAG reaction products) are already present in the vitrified hazardous waste materials, they are treated as the second glass 208, and further processed in accordance with the steps 108, 110, and 112 to manufacture corresponding glass microspheres. The resulting glass microspheres created in accordance with this embodiment of the invention, find use in many applications that require an inexpensive, and high performance filler particles for composites. Another example of a post-consumer non-hazardous consumer byproducts that may be used instead of or in addition to the batch 200 is incineration ash resulting from incinerating waste materials.

The method 100 of manufacturing a plurality of glass microspheres proposed by the present invention is discussed in more detail in connection with various example embodiments described herewith. The following examples demonstrate exemplary embodiments of the present invention at least insofar the method of manufacturing a plurality of glass microspheres.

Example 1

This example describes an embodiment of the present invention in which fly ash is used as a part of the batch 200. Additionally, the present example illustrates the embodiment of the present invention wherein the RAG components 204 are intrinsic and/or integral to the SGP raw materials 202.

Fly ash is an industrial byproduct that falls into the category of materials defined herein as "recovered materials". ASTM C618 provides two types of fly ash classifications; Class F: $SiO_2+Al2O3+Fe2O3 \geq 70\%$, and Class C: $SiO_2+Al2O3+Fe2O3 \geq 50\%$. All in wt %.

The RAG components in fly ash comprise unburned carbon, which can vary from 0.2 to as high as 3.5 wt %, in addition to iron oxides, and sulfur compounds. Iron oxides are almost always present in fly ash, mostly in the form of magnetite ($FeO+Fe_2O_3$) and sulfur in the forms of sulfates, sulfites, or sulfides.

A typical class F fly ash, has less sulfur than a class C fly ash. The initial content of sulfur as sulfate in the flyash is usually less than 1 wt % depending on how much sulfur has been scrubbed off from the flu gas via a flu gas desulfurization unit. Without a significant scrubbing action, the amount of sulfate may be around 0.5%, and the molar ratio of unburned carbon to $SO_3$ varies from less than one to as much as 10.

The wt % of the major oxides in the class F fly ash are: $SiO_2$ 35-65 wt %, $Al_2O_3$ 20-45 wt %, FeO—$Fe_2O_3$ 3-12 wt %, and CaO 1-10 wt %. In this example, iron oxide(s), sulfur compounds, and unburned carbon are considered part of the RAG components 204, despite of being constituents of the fly ash that is part of the SGP raw materials 202. Therefore, the RAG components 204 are intrinsic (integral) to the SGP raw materials 202.

According to one embodiment of the present invention, deficiencies in the RAG components are compensated by dosing the appropriate amount of a deficient component to either the batch 200, and/or the first glass melt 206 while in the melter system. In contrast, if the RAG components are already part of the fly ash, any RAG component deficiencies are compensated by adding extra SGP raw materials 202 to the batch until the concentration of a particular RAG component is brought within the desired range in the batch 200. The resulting batch 200 may also require the addition of those RAG components 204 that may have become deficient due to the addition of additives. A batch 200 is prepared with Fly ash (type F) 40-80 parts, silica sand 20-30 parts, gypsum 1-3 part, and 0-25 parts of one or a combination of lime stone, dolomite, salt cake, soda-ash, Pyrex glass cullet, a soda lime glass cullet, and potash. The resulting batch 200 has a composition that falls within the prescribed range of composition for the first glass melt 206 disclosed earlier. The composite redox number of the batch 200 is within the range of −0.1 to −10.

Next, the batch 200 is blended prior to being melted in an electric melter system 300. The residence time in the melter system 300 is about 5 hours. The melter system 300 comprises a primary melting zone 310, where a glass melt pool is created at an average temperature ranging from about 1300° C.-1450° C. as measures in the molten glass between the electrodes. The melter is operated with a cold cap over the molten glass in the primary melting zone 310. The melter system 300 has a processing zone 320, and a discharge zone 330 comprising a side airlift assisted discharge port. Bottom gravity assisted discharge ports are provided in melting zone 310, and the processing zone 320 to empty the molten glass inventory of the melting zone, and the processing zone when needed in such occasions like repair, and scheduled shut down periods. In case a molten metal layer formed at the bottom of the either zone, the molten metal layer may be discharged through the bottom discharge ports. The melter electrodes housed in the primary melting chamber 310, comprise molybdenum alloyed with zirconium oxide, and are powered with a three phase AC power supply.

As the batch 200 melts into the first glass 206, a portion of the unburned carbon in the ash oxidizes by oxygen in air forming $CO_2$ within the cold cap, and near the molten glass interface. As the melting progresses from the cold cap to the glass pool, another portion of the unburned carbon reacts with sulfate according to the redox reaction (2), forming $SO_2$ gas. The remaining unburned carbon as it comes into intimate contact with the first glass melt 206, reacts with sulfate according to the redox reactions (3) and (4), forming a plurality of the reaction products that include iron sulfide. The non-equilibrium redox reactions (3) and (4) are terminated before reaching the equilibrium state by effectively discharging the first glass melt 206 from the melter system 300. Injection ports accessible through the plenum of the processing zone of the melter system 300 allow the delivery of the additional RAG components 204 to be directly incorporated into the first glass melt 206 while in the melter system 300. Pressurized air assisted graphite spray nozzles are provided to deliver graphite powder or any other gaseous or liquid RAG components 204 into the melter system 300. The capability of being able to incorporate directly the RAG components 204 into the first glass melt 206, while in the melter system 300 allows for controlling an accurate balance/amount of gas forming species that are carried over to the second glass 208. The discharged glass is cooled rapidly over a large steel plate forming the second glass 208. Because of terminating the redox reactions before reaching equilibrium in the melter system 300, a predetermined mixture of sulfate and sulfide coexists in the second glass 208. The resulting second glass 208 is then pulverized in step 108 to an average particle size of about 60-80 microns forming the silicate glass fragments 210.

Next, the silicate glass fragments 210 are suspended in a combustion air stream entering a burner system provided inside a firing furnace at an average rate of approximately 1 kg of particles per 1 $m^3$ of air. The firing furnace is an upward vertical gas fired cylindrical furnace. A co-concentric burner fueled with natural gas is used and the injection velocity at an axial upward direction is set to be about 2-10 m/s. The amount of combustion air supplied to the furnace is adjusted to be close to the stoichiometric air-gas ratio in such a way to have a relatively neutral ambient atmosphere surrounding the silicate glass fragments 210. In the combustion zone of the furnace and at an average firing temperature of about 1300-1550° C. (as measures in the combustion zone), the silicate glass fragments 210 melt and expand to form the hollow glass microspheres 212. Outside ambient air is allowed to enter the furnace near the top after the combustion zone, resulting in a sharp temperature drop and immediate cooling of the microspheres. The furnace is under a mild vacuum, and glass microspheres 212 are collected in a hot cyclone. The overall residence time in the furnace averages to less than 4 seconds.

It is of note the glass microspheres 212 are manufactured in accordance with an embodiment of the method of the present invention that comprises a glass melting step in which non-equilibrium redox reactions are provided up by a redox active group, followed by a glass remelting step, capable of self-generating gas by at least one redox reaction to form a plurality of hollow glass microspheres.

It is also of note that in accordance with an embodiment of the method of the present invention, RAG components are incorporated directly into a glass melt. The method takes advantage of the non-equilibrium redox reactions occurring in the glass melt upon incorporation of the RAG components. Accordingly, a glass melt with a desired composition is formed inside the multizone melter system. The melter system comprises at least a melting zone, a processing zone, and a discharge zone having discharge means to discharge the molten glass at will. The glass melt is transferable from the melting zone to the processing zone essentially in a one-way forward movement, and not vice versa. As such, the glass melt can move from the melting zone to the processing zone, but not in the opposite direction. In the processing zone of the melter system, the RAG components are incorporated into the glass melt, and are uniformly dispersed into the glass melt. The glass melt from the processing zone, upon incorporation of, or impregnation with the RAG components, is discharged from the melter system. The discharged glass upon cooling is fragmented. The RAG components in the glass fragments upon heating and remelting in the furnace go through predetermined redox reactions and form a plurality of gases. The plurality of gases is entrapped in the molten glass fragments and as a result the molten glass fragments expand, and hollow glass microspheres are formed. Therefore, to summarize, the glass microspheres have been formed, in accordance with the above example by a method comprising the following steps: forming a batch, melting the batch into a first glass melt in a melting zone of multizone melter system, transferring the first glass melt from a melting zone to a processing zone, impregnating the first glass melt with RAG components while in the melter system, discharging and cooling the first glass melt from the melter system to form a second glass, pulverizing the second glass into glass fragments, heating and melting the glass fragments, expanding the molten glass fragments into hollow glass microspheres by generating and trapping gas via the RAG components in the second glass melt, and cooling the hollow glass microspheres.

It is of note that no art reference discloses utilizing industrial waste or recycled byproducts as raw materials to melt a glass precursor from which silicate glass fragments suitable for making hollow glass microspheres are manufactured by the process outlined above.

Example 2

In accordance with a further example of the present invention, a municipal waste incineration-ash, and/or a medical waste incineration-ash, is used as a part of the SGP raw materials. Silica flour is added in order to increase the silica content of the composite batch 200. As a part of the RAG components 204, gypsum is added to the batch 200 to adjust the sulfate content to achieve a prescribed chemical composition for the first glass melt 206. The resulting batch 200 is melted in the same type melter system that is employed in the Example 1. Hydrogen sulfide, with and without a carbonaceous RAG component 204, such as graphite is incorporated into the first glass melt 206 while in the melter system 300, in order to control the gas volume generated in the second glass melt 208 via the redox reactions while in the furnace. The first glass melt 206 is discharged from the melter system 300, cooled, and pulverized to form the silicate glass fragments 210. The newly formed silicate glass fragments 210 are reheated in the firing furnace to about 1300-1550° C. to form the glass microspheres 212. The average residence time in the furnace is less than 4 seconds. In accordance with this example, a value added product is made from otherwise waste materials that in most cases are regulated and may not be land filled in unregulated landfill areas.

Example 3

In yet another example of the present invention, a vitrified low level radioactive waste material is treated as the second glass 208. The second glass 208 is a borosilicate-based glass. The solid pieces of the second glass 208 are pulverized and screened to obtain the desired silicate glass fragments 210. All the processing and handling steps are carried out under the strict rules and procedures for handling and processing radioactive materials as set forth by the applicable rules and guidelines of the responsible USA government agencies and departments such the US Department of Energy, and the USA Environmental Protection Agency. The silicate glass fragments are fired in a firing furnace that has suitable off gas treatment capabilities for radioactive gaseous and particulate emissions. The firing temperature is set around 1200-1400° C. The resulting radioactive glass microspheres 212 are chemically durable and stable. The radioactive glass microspheres may be used as a radiation source, for example in medical applications. In addition, the radioactive glass microspheres can be reused, and repackaged easily as a flowable solid material.

Example 4

In accordance with another example of the present invention, value added glass microspheres are produced from the asbestos containing waste materials. The asbestos containing waste materials normally contain gypsum and iron wires (i.e. metal mesh screen) in their makeup (e.g. examples of intrinsic RAG components). The asbestos containing waste material of the present example is a part of the SGP raw materials, and included in the batch 200. Silica flour is added to the batch 200 to bring the silica level of the first glass melt 206 within the prescribed range in accordance with the present invention. No additional RAG component is added to the batch 200. Next, the batch 200 is melted in a similar melter system 300 employed in the Example 1. A mixture of hydrogen and nitrogen gas is incorporated into the first glass melt via bubbling into the processing zone 320 of the melter system 300 to adjust the balance of sulfide-sulfate in the first glass melt 206, and consequently in the second glass 208 in accordance with the present invention. The first glass melt 206, which represents the vitrified asbestos waste containing materials upon cooling, forms the second glass 208, and is ground-up to form the silicate glass fragments 210. The silicate glass fragments 210 are reheated in the firing furnace to about 1300-1500° C. to form glass microspheres 212. The average residence time in the furnace is less than 4 seconds. Further redox adjustments are carried out by injecting graphite powders into the first glass melt to produce hollow glass microspheres with an average particle density of less than 1 g/cc. This example also illustrates the embodiment of the invention wherein an elemental multivalent metal (e.g. iron) is used as one of the RAG components 204.

Example 5

This example illustrates an embodiment of the present invention wherein glass raw materials are used as SGP raw materials 202, in addition to the RAG components 204 in making up the batch 200.

The SGP raw materials 202 comprise in accordance with the present example silica flour (or equally ground quartz), kaolin, dolomite (of particulate dimensions of under 200 mesh), potash feldspar (orthoclase), and soda ash. The RAG components 204 in accordance with the present example comprise iron oxide (rust), gypsum (of particulate dimensions under 200 mesh), and carbon (powdered graphite). The batch 200 is formed with varying concentrations of ingredients of the SGP raw materials 202 as follows: silica sand, 10-40 parts, kaolin, 30-60 parts, dolomite, 20-40 parts, potash feldspar, 10-15 parts, soda ash 2-3 parts, and the RAG components 204.

The RAG components 204 exemplarily comprise iron oxide (rust), 1-5 parts, and gypsum, 2-5 parts. Carbon at a total level of 0.1-2 parts is added both to the batch 200, and is incorporated directly into the first glass melt 206 while in the melter system 300. The composite redox number of the first glass 206 is less than zero.

After forming the batch 200 by combining the above enumerated SGP raw materials 202, and the RAG components 204, the batch 200 is melted in a melter system 300. The melting of the batch 200 in the melting zone of the melter 310 to form the first glass 206 takes between 5-10 hours at an average temperature between 1300-1450° C. as measures in the melt pool.

As with the previous examples, a melter 300 is preferably operated with a cold cap over the molten glass in the primary melting zone 310. Carbon is delivered to the first glass melt 206 in the form of graphite powder entrained in pressurized air, with and without hydrogen sulfide. The mixture is bubbled into the first glass melt 206, while in the processing zone 320, to induce non-equilibrium redox reactions leading to a desired balance between sulfide and sulfate ions in the first glass melt 206, and consequently the second glass 208. In the above process, residual carbonaceous materials are provided in the first glass melt 206 when desired. Hydrogen sulfide and carbon are effective means to adjust the particle density of the hollow glass microspheres 212. As the first glass melt 206 enters the discharge zone 330, the non-equilibrium redox reactions have reached the desired non equilibrium state and the first glass melt 206 is discharged from the melter 300 via a melt discharge trough. The discharged glass is cooled rapidly over a large steel plate forming the second glass 208. Because of terminating the redox reactions before reaching equilibrium in the melter system 300, by discharging and rapidly cooling the molten glass, a mixture of sulfate and sulfide coexist in the second glass 208. The resulting second glass 208 is then pulverized in step 108 to an average particle size of about 60-80 microns forming the silicate glass fragments 210.

Next, the silicate glass fragments 210 are converted into hollow glass spheres 212 by following a procedure similar to the procedure outlined in the Examples above. The resulting hollow glass microspheres 212 have a structure similar to the one schematically represented in FIG. 2, that will be described in detail bellow. The average particle density of the obtained hollow glass microspheres 212 is below 1 g/cc.

Example 6

Example 6 illustrates an embodiment of the present invention wherein carbon is added to the first glass 206 while in the melter system 300. In accordance with this embodiment of the present invention the SGP raw materials 202, are the ones used as discussed above in connection with Example 5, are combined with the RAG components 204 exemplarily discussed above in connection of the Example 5, except carbon, to form the batch 200. The batch 200 is subsequently melted in the melting zone 310 of the melter system 300. A graphite powder spray, in combination with pressurized air is used to inject fine graphite powder into the first glass melt 206 while in the melter. An example for a commercially available graphite powder spray is a solid lubricant aerosol concentrate, such as DAG® 2404 or DAG® 154 (from Henkel). As an alternative, fine powder graphite or coke, or carbon black (with an average particle size of less than 10 microns), is entrained in a gaseous, vapor, or liquid carrier at a loading such that it is dispersed uniformly into the first glass melt while in the melter system 300, for example by injection or spraying into the molten glass. The first glass melt 206 is discharged and further processed in accordance with the method of the present invention, and as disclosed above as well in connection with Examples 1 to 5, to manufacture the glass microspheres 212.

Example 7

This example illustrates an embodiment of the present invention wherein iron is added as part of the recycled waste byproduct to the glass forming constituents of the SGP raw materials 202 of the Example 5. Calcined red mud (from the aluminum smelting process), at a level of 15-25 parts, is included in the SGP raw materials 202. As a result, there is no longer a need to add soda ash, since the calcined red mud contains about 5-8 wt % sodium oxide. Additionally, iron oxide (rust) is no longer added, since red mud contains about 45-55 wt % iron oxide. Subsequently, the first glass 206 is melted, and converted to the second glass 208 as outlined in connection with either one of the examples 5, and 6 above. The resulting second glass 208 is pulverized to form the silicate glass fragments 210, which are then converted to hollow glass microspheres 212 in accordance with the embodiments of the method of the present invention. The resulting hollow glass microspheres 212 are precursor for production of ferrimagnetic hollow glass ceramic microspheres. This is achieved by heat-treating the glass microspheres 212 at a temperature below the deformation temperature of the microspheres. Upon heat treatment, and due to formation of nano-size magnetite crystals that are homogenously dispersed in the glass wall of the microsphere 212, glass-ceramic microspheres with strong ferromagnetic properties are produced. By increasing the concentration of iron in the first glass 206, for example via the addition of more red mud in the raw materials 202, glass microspheres with iron oxide content of 10-20 wt % are obtainable.

The present invention enables the production of highly durable and strong hollow glass microspheres at a high throughput using inexpensive raw materials. The throughput is high because the combined residence time in the melter system 300 and the firing furnace is less than 12 hours, and preferably 5 hours or less. This makes the production process to be highly sustainable (energy efficient) since it is possible to take advantage of fast manufacturing methods. Another advantage of the method of the present invention is that the RAG components 204 inherently exist in the many forms of the recovered materials, thus a relatively low cost for the raw materials can be realized. This makes possible the production of an eco-friendly product, by utilizing industrial waste byproducts and converting them into high value added products.

According to the embodiments of the present invention, the glass microspheres 212 manufactured according to the methods of the invention are used in at least one of the following applications: in the oil and gas industry, as light weight fillers for various composites, in building materials, in the automotive and aeronautic industries, in the medical industry, integrated in paints and road signs, and as functional fillers for various composite materials. Additionally, the glass microspheres manufactured according to the method of the present invention are suitable to be subjected to various surface treatments and modifications to impart desired surface functionalities to the resulting microspheres. Examples are coloring the surface, coating the surface with various functional coatings such as magnetic, electrically conductive, light reflective, self-cleaning, and attaching surface functional groups to the microsphere surface such as ionic chemical species, organo-functional groups such as silanol functional group, and hydroxyl functional groups. Hydraulic fracturing involves pumping fracturing fluids into an oil or gas well at high pressure to create fractures in the rock formation that allow oil or gas to flow from the fractures to the wellbore. The fracturing fluid is normally water based, and comprises propping particles (proppants) and other additives. The microspheres 212 of the present invention that have very high crushing strength above 5000 psi, and preferably above 10,000 psi are excellent candidates as propping particles to keep fractures open once they are produced under high pressure.

Therefore, an embodiment of the present invention, also comprises a composite product, comprising a combination of the plurality of glass microspheres manufactured in accordance with the present invention, and at least one of a plurality of polymer matrices, a plurality of cementiteous matrices, a plurality of fluid matrices, a plurality of solid matrices, a plurality of fiber containing matrices, and a plurality of metal matrices.

Due to the superior acid and alkaline resistance of the glass microspheres 212 manufactured according to the present invention, the glass microspheres can be safely used in high alkalinity environments, such as in cements and concretes, and in hydraulic fracturing liquids that are acidic. The cements may comprise one or a combination of Portland cement, aluminous cements, lime cements, magnesium based cements, calcium sulfo-aluminate cements, phosphate cements, gypsum, geopolymers, and others. The glass microspheres 212 manufactured according to the present invention are also used in acidic environments, such as in acidic hydrofracking fluids. The glass microspheres 212 of the present invention can be coated and/or surface treated with a variety of coating materials and surface treatment agents and equipment. The coating materials comprise inorganic coating materials, organic coating materials, and a combination thereof. The coating is applied to the external surface of the microspheres 212 to impart specific surface properties to the microspheres 212. Examples of such coatings are colorants, electrically active, magnetically active coating, reflective, chemically active, mechanical property enhancing, and biologically active. The surface treatments include: silanization, passivation, activation, ion exchange, etc.

Cements or other mediums containing the glass microspheres of the present invention are used in applications related to the oil and gas industries, such as in oil and gas well drilling cement, oil and gas well cementing casing, and oil and gas fracking including but not limited to shale oil fracking, and hydraulic fracking. Since in these types of applications the utilized microspheres are required to have relatively high hydrostatic pressure rating, normally above 1000 psi and as high as 20,000 psi, the glass microspheres of the present invention are particularly suitable for these applications.

Figure 2:
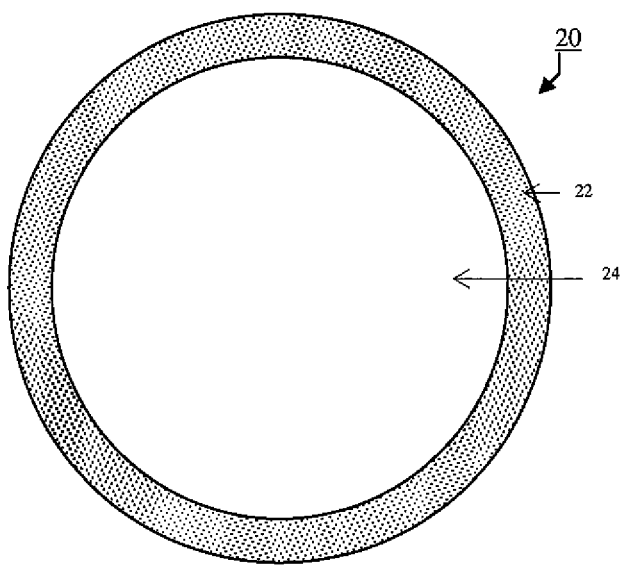
FIG. 2 comprises representation of a glass microsphere.

Referring now to FIG. 2, FIG. 2 comprises a schematic illustration of a glass microsphere produced in accordance with the methods of the present invention.

The glass microsphere manufactured according to the various embodiments of the present invention comprises in its most general embodiment a plurality of glass walls, and a plurality of hollow spaces, the plurality of glass walls enclosing the at least one of the plurality of hollow spaces. The plurality of glass walls comprises a second glass. The second glass is formed by further processing a first glass melt. The first glass melt is formed by melting a batch comprising at least one of a plurality of raw materials. The plurality of RAG components present in the first glass melt and a melt of the second is capable of providing at least one of a plurality of redox reactions and a plurality of events in the first glass melt and the melt of the second glass, thereby creating the glass microsphere.

In accordance with one embodiment of the present invention, the glass microsphere manufactured according to the embodiments of the present invention comprises a single or a plurality of glass walls, and a single or a plurality of void spaces defined by said wall or walls. The terms of "glass microsphere" and "hollow glass microsphere" are interchangeably used throughout this document to refer to a structure that comprises one or a plurality of enclosure glass walls, forming a plurality of interior and/or exterior (outer) partition walls, surrounding at least one or a plurality of hollow spaces.

FIG. 2 comprises representation of a glass microsphere produced in accordance with the methods of the present invention. In accordance with FIG. 2, the exemplary hollow glass microsphere 20 comprises a spherical outer glass wall 22 and a substantially enclosed cavity or void 24 defined by the outer glass wall 22. The configuration of the sphere 20 in FIG. 2 resembles the general configuration of harvested cenospheres from coal burning fly ash. The outer glass wall 22 comprises a homogenous second glass 208.

A hollow glass microsphere as shown in FIG. 2 has a specific strength, which is defined by the crushing strength of the microsphere divided by the particle density of the microsphere in the range of about 40-340 MPa/(g/cc), where MPa is mega Pascal. The specific strength over a value of 100, normally represents glass microspheres having a particle density over 0.4-0.5 g/cc. Also, the smaller the average particle size is, the higher the specific strength would be.

In certain preferred embodiments, the hollow glass microsphere has one or more of the following characteristics, which are also generally characteristics of harvested cenospheres:
an aspect ratio of between about 0.8 and 1;
a void volume of between about 10 and 95%, based on the total volume of the microsphere;
an outer wall thickness of about 2 and 54% of the microsphere radius.

Referring now to FIG. 3, FIG. 3 is a schematic representation of a glass melter system 300 in accordance with the present invention.

As mentioned previously in this document, a glass melter system 300 is employed at least for melting the components of the batch 200. The melter, one possible configuration of which is shown in FIG. 3, comprises three zones, namely a glass melting zone 310, a glass processing zone 320, and a glass discharge zone 330. In the melting zone 310, apart from phenomenon that are related to the melting of the batch 200 into the first glass melt 206, the RAG components 204 may as well be introduced. The RAG component 204 is in accordance with one embodiment of the present invention in a gaseous form. Alternatively, additional RAG components 204 are mixed with the materials of the batch 200 to be melted. The processing zone 320 is configured such to allow certain processes to take place that are related the first glass melt 206 while in the melter system 300 including but not limited to: the introduction and incorporation of the RAG components 204 into the first glass melt 206, controlling the overall residence time, by storing or releasing the first glass melt 206 from the melter system 300, homogenizing the first glass melt 206, nucleating the first glass melt 206, refining the first glass melt 206, and reheating the first glass melt 206. The discharge zone 330 comprises one or a combination of a trough an outlet throat, an airlift system, re-heaters, etc. The RAG components 204 can be incorporated into the first glass melt 206 as well inside the discharge zone 330, right before, and while being discharged from the melter system 300.

Although the foregoing descriptions of certain preferred embodiments of the present invention have shown, described and pointed out some fundamental novel features of the invention, it will be understood that various omissions, substitutions, and changes in the form of the detail of the apparatus as illustrated as well as the uses thereof, may be made by those skilled in the art, without departing from the spirit of the invention. Consequently, the scope of the present invention should not be limited to the foregoing discussions.

What is claimed is:

1. A method of producing microspheres, comprising:
melting a batch into a first glass melt;
processing the first glass melt into a second glass comprising adding a gas to the first glass melt;
pulverizing the second glass into a plurality of glass fragments comprising (i) sulfide and (ii) sulfate, and
thermally processing the plurality of glass fragments into microspheres, wherein the thermally processing comprises heating to cause reaction of (i) the sulfide with (ii) the sulfate, to form $SO_2$ gas,
wherein the second glass has a melting temperature less than the first glass, and
the gas comprises a sulfur containing compound.

2. The method of claim 1, wherein said batch comprises at least one member selected from the group consisting of raw materials, a plurality of redox active group components, at least one recovered material and a combination thereof.

3. The method of claim 1, wherein said batch comprises at least one recovered material selected from the group consisting of a silicate material, an aluminosilicate material, a borosilicate material, fly ash, bottom ash, slag, waste glass, red mud, kiln dust, mine tailings and spent oil shale.

4. The method of claim 1, wherein said processing further comprises adding another gas and/or at least one member selected from the group consisting of a liquid, a solid and an aerosol form.

5. The method of claim 1, wherein the melting of said batch into a first glass melt occurs in a melter system, and
wherein the melter system comprising at least one of a melting zone melting said batch into said first glass melt, a first glass melt processing zone, and a discharge zone.

6. The method of claim 5,
wherein said adding comprising adding the gas into at least one of said melting zone, said processing zone, and said discharging zone of the melter system.

7. The method of claim 1, wherein a total residence time of the first glass melt in a melter system is less than 18 hours.

8. The method of claim 1, wherein a concentration of sodium oxide is less than 4 wt % based on a mass of the first glass melt.

9. The method of claim 1, wherein the microspheres comprise sulfide.

10. The method of claim 1, wherein the mircorspherese comprise ferrous iron.

11. The method of claim 1, wherein the gas further comprises a carbon containing compound.

12. Microspheres produced by the method according to claim 1, wherein:
the microspheres comprise sulfide,
the microspheres each comprise a homogenous glass, and
the glass in the microspheres has a ratio of ferrous iron to total iron of less than 80%.

13. A method of producing microspheres, comprising:
melting a batch into a first glass melt;
processing the first glass melt into a second glass comprising adding a gas to the first glass melt;

pulverizing the second glass into a plurality of glass fragments comprising (i) carbon, and (ii) sulfate, and thermally processing the plurality of glass fragments into microspheres, wherein the thermally processing comprises heating to cause reaction of (i) the carbon, with (ii) the sulfate, to form $SO_2$ gas, wherein the second glass has a melting temperature less than the first glass, and the gas comprises a carbon containing compound.

14. The method of claim 13, wherein the gas further comprises a sulfur containing compound.

15. The method of claim 13, wherein said batch comprises at least one recovered material selected from the group consisting of a silicate material, an aluminosilicate material, a borosilicate material, fly ash, bottom ash, slag, waste glass, red mud, kiln dust, mine tailings and spent oil shale.

16. Microspheres produced by the method according to claim 13, wherein:

the microspheres comprise sulfide, the microspheres each comprise a homogenous glass, and the glass in the microspheres has a ratio of ferrous iron to total iron of less than 80%.

17. A method of producing microspheres, comprising:

melting a batch into a first glass melt;

processing the first glass melt into a second glass comprising adding a gas to the first glass melt;

pulverizing the second glass into a plurality of glass fragments comprising (i) carbon and/or sulfide, and (ii) sulfate, and thermally processing the plurality of glass fragments into microspheres, wherein the thermally processing comprises heating to cause reaction of (i) the carbon and/or sulfide, with (ii) the sulfate, to form $SO_2$ gas, wherein the second glass has a melting temperature less than the first glass, and the gas comprises a carbon containing compound.

18. The method of claim 17, wherein the gas further comprises a sulfur containing compound.

19. The method of claim 17, wherein said batch comprises at least one recovered material selected from the group consisting of a silicate material, an aluminosilicate material, a borosilicate material, fly ash, bottom ash, slag, waste glass, red mud, kiln dust, mine tailings and spent oil shale.

20. Microspheres produced by the method according to claim 17, wherein:

the microspheres comprise sulfide, the microspheres each comprise a homogenous glass, and the glass in the microspheres has a ratio of ferrous iron to total iron of less than 80%.

\* \* \* \* \*